United States Patent
Gibson et al.

(10) Patent No.: US 7,711,185 B2
(45) Date of Patent: May 4, 2010

(54) SYSTEM FOR CUSTOMER AND AUTOMATIC COLOR MANAGEMENT USING POLICY CONTROLS

(75) Inventors: Bradley P. Gibson, Seattle, WA (US); Anthony Presley, Bellevue, WA (US); Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/467,156

(22) Filed: May 15, 2009

(65) Prior Publication Data

US 2009/0228955 A1 Sep. 10, 2009

Related U.S. Application Data

(62) Division of application No. 10/704,833, filed on Nov. 10, 2003, now Pat. No. 7,636,468.

(51) Int. Cl.
*G06K 9/00* (2006.01)
(52) U.S. Cl. ...................................... 382/162
(58) Field of Classification Search ......... 382/162–167, 382/240; 345/589–604; 358/1.9, 500–540; 715/700, 722–723, 853
See application file for complete search history.

(56) References Cited

U.S. PATENT DOCUMENTS

| | | | |
|---|---|---|---|
| 5,049,986 A * | 9/1991 | Aono et al. | 358/522 |
| 5,502,580 A * | 3/1996 | Yoda et al. | 358/518 |
| 5,668,596 A | 9/1997 | Vogel | |
| 5,806,081 A | 9/1998 | Swen | |
| 6,462,748 B1 | 10/2002 | Fushiki et al. | |
| 6,525,721 B1 | 2/2003 | Thomas et al. | |
| 6,628,828 B1 | 9/2003 | Stokes et al. | |
| 6,831,999 B2 * | 12/2004 | Haikin | 382/162 |
| 7,365,754 B2 * | 4/2008 | Stokes et al. | 345/589 |
| 7,466,447 B2 * | 12/2008 | Stokes et al. | 358/1.9 |
| 7,636,468 B2 * | 12/2009 | Gibson et al. | 382/162 |
| 2008/0195977 A1 * | 8/2008 | Carroll et al. | 715/853 |

OTHER PUBLICATIONS

Littlewood, D.J. et al., "Pareto-Optimal Formulations for Cost versus Colorimetric Accuracy Trade-Offs in Printer Color Management", ACM Transactions on Graphics, vol. 21, No. 2,,(Apr. 2002),132-175.

(Continued)

*Primary Examiner*—Sherali Ishrat

(57) ABSTRACT

Methods and apparatuses for supporting a color management system that processes an image in accordance to a hierarchically-structured policy are provided. The policy may be modeled with a schema in which the policy is organized with a plurality of policy levels. Policy settings at a lower policy level may override policy settings at a higher policy level, which may be inhibited with a lockout mechanism. A user interface supports the capability of a user configuring policy settings through a series of dialog boxes. The dialog boxes are hierarchically organized in accordance with configuration levels, where the configuration levels are associated with the policy levels. The dialog boxes provide a consolidated approach for configuring a color management system by a user. An interface is supported, enabling a component to send inputs to a color management system in order to configure the policy.

20 Claims, 20 Drawing Sheets

OTHER PUBLICATIONS

Mooney, M.A. "Managing Color in Interactive Systems", Sun Microsystems Computer Corp. Tutorial,(Apr. 1998),169-170.

Stone, M.C. et al., "Color Gamut Mapping and the Printing of Digital Color Images", ACM Transactions Graphics, vol. 7 No. 4,(Oct. 1988), 249-292.

Chung, Robert et al., "Color Matching with ICC Profiles-Take One", The Fourth Color Imaging Conference Color Science, Systems and Applications,10-14.

Lowden, Ken "Proofing Technology Advances Offers New Options-And Also Risks", www.inkmarkeronline.com, American Ink Maker,(Sep. 2001),42-48.

Fraser, Bruce "The Power of ColorSync Color Matching, Tap Into the Part of Your System that's Made for Matching Colors", www.macworld.com, (Jun. 1998),105-107.

"Notice of Allowance", U.S. Appl. No. 10/704,833, 20 pages.

"Foreign Office Action", EP Application No. 04779769.1, (Dec. 9, 2009),7 pages.

\* cited by examiner

SYSTEM FOR CUSTOMER AND AUTOMATIC COLOR MANAGEMENT USING POLICY CONTROLS

PRIORITY

This application is a divisional of and claims priority under 35 U.S.C. §121 to U.S. patent application Ser. No. 10/704,833 filed Nov. 10, 2003 now U.S. Pat. NO. 7,636,468, the disclosure of which is incorporated by reference herein in its entirety.

CROSS-REFERENCE TO RELATED APPLICATIONS

This application is related to application Ser. No. 10/683,153 filed Oct. 14, 2003, entitled "COLOR MANAGEMENT SYSTEM THAT ENABLES DYNAMIC BALANCING OF PERFORMANCE WITH FLEXIBILITY," now U.S. Pat. No. 7,466,447, the disclosure of which is incorporated by reference herein in its entirety.

FIELD OF THE INVENTION

The present invention relates to color management technology for a computer system, and in particular provides control of color management.

BACKGROUND OF THE INVENTION

With a one-input-one-output workflow, as supported by the prior art, color management was not typically required. Images were typically scanned by a professional operator using a single scanner producing a color representation, e.g., cyan, magenta, yellow, and black (CMYK) format, that was tuned to a single output device. Spot colors were handled either by mixing spot inks or by using standard CMYK formulas in swatch books. An accurate monitor display was not typically available. The system worked because the CMYK values that the scanner produced were tuned for the output device, forming a closed loop that dealt with one set of numbers.

More recently, the types of input and output devices have increased dramatically. Input devices include not only high-end drum scanners but also high-end flatbed scanners, desktop flatbeds, desktop slide scanners, and digital cameras. Output devices include not only web and sheetfeed presses with waterless inks, soy inks, direct-to-plate printing, and Hi-Fi color but also digital proofers, flexography, film recorders, silk screeners, color copiers, laser printers, inkjet printers, and even monitors that function as final output devices. The diversity of input and output devices vastly complicates the approach of a closed workflow as previously discussed. Thus, possible workflows may be associated with a many-to-many mapping of input devices to output devices.

The result is a potentially huge number of possible conversions from input devices to output devices. With an m-input to n-output workflow, one may need m×n different conversions from the input to the output. With the increasing diversity of input and output devices, the task of providing desired color conversions from input to output can easily become unmanageable.

Color management is a solution for managing the different workflows that may be supported between different input device and output device combinations. Color management typically supports an intermediate representation of the desired colors. The intermediate representation is commonly referred as a profile connection space (PCS), which may be alternately referred as a working space. The function of the profile connection space is to serve as a hub for the plurality of device-to-device transformations. With such an approach, the m×n link problem is reduced to m+n links, in which only one link is needed for each device. Each link effectively describes the color reproduction behavior of a device. A link is commonly referred as a device profile. A device profile and the profile connection space are two of the four key components in a color management system.

As based upon current International Color Consortium (ICC) specifications, the four basic components of a color management system are a profile connection space, a set of profiles, a color management module (CMM), and rendering intents. The profile connection space allows the color management system to give a color an unambiguous numerical value in CIE XYZ or CIE LAB color space that does not depend on the quirks of the plurality of devices being used to reproduce the color but instead defines the color as a person actually sees the color. (Both CIE XYZ and CIE LAB are color spaces that are modeled as being device independent.) A profile describes the relationship between a device's RGB (red, green, and blue) or CMYK control signals and the actual colors that the control signals produce. Specifically, a profile defines the CIE XYZ or CIE LAB values that correspond to a given set of RGB or CMYK numbers. A color management module (CMM) is often called the engine of the color management system. The color management module is a piece of software that performs all of the calculations needed to convert the RGB or CMYK values. The color management module works with the color data that is contained in the profiles. Rendering intents includes four different rendering intents. Each type of rendering intent is a different way of dealing with "out-of-gamut" colors, where the output device is not physically capable of reproducing the color that is present in the source space.

As a workflow becomes more complex, color management becomes more important to the user for managing colors of an image file as the image file flows from input (e.g., a scanner) to output (e.g., printer). A workflow utilizes four stages of color management that include defining color meaning, normalizing color, converting color, and proofing. Defining the color meaning includes determining if a profile is embedded in the content and defining a profile if there is no embedded profile. The workflow can then proceed with normalizing color to a working space (corresponding to a device independent color space) or with converting the color representation of the image file directly to the destination space. If the color is normalized to a working space, operations are performed in the working space, e.g., the user modifying selected colors in the working space. A color management system can then determine a transformation table from the source profile and the destination profile, using the common values from the working space. Consequently the color management system can convert a source image to a destination image using the transformation table.

With the prior art, color management is typically administered at both the application level and the device level. For example, with the Adobe® Photoshop® software application, which is a professional image-editing standard for producing high quality images for print and the Web, the user configures the application in accordance with a policy. The policy is a set of rules or actions that may be dependent on different contingencies. For example, with an untagged document, the Photoshop application can assume a profile, assign a profile, or assign a profile and do a conversion to some other profile in accordance with user selections selected by the user in a dialog box. The user typically responds to a plurality of dialog boxes in order to establish the desired policy. The Photoshop application allows the user to configure other aspects of color management, including configuring printer controls (e.g., a printer profile and rendering intent). If, however, the output device is changed, the user typically must re-enter the appropriate dialog and modify the policy.

The above example illustrates a common deficiency with the prior art. In particular, a policy is established for each combination of application, device, and system. A user may use a plurality of applications in processing colors documents, where each application requires the user to respond to a series of dialog boxes for each application. Moreover, the user may process a color document from one of a plurality of input devices and to one of a plurality of output devices with one or more applications. Furthermore, in a commercial or educational setting a plurality of users may use the same system or each of a plurality of users may use a different system in which the consistency of color management policies is desired. Having to configure policies separately for each application, device, user, and system can be very demanding on the user. Hence, there is a real need in the industry to provide a more integrated and consolidated approach for controlling the policies of color management systems.

BRIEF SUMMARY OF THE INVENTION

The present invention provides methods and apparatuses for supporting a color management system that processes an image in accordance to a policy that is structured in a hierarchical fashion. The policy may be modeled with a schema in which the policy is organized with a plurality of policy levels, including a system level, a user level, an operational level, profile level, a device and codec (image format) level, and a color management application programming interface level. With an aspect of the invention, policy settings at a lower policy level may override policy settings at a higher policy level. However, a lockout mechanism may prevent a lower policy level from overriding a higher policy level.

With another aspect of the invention, a user interface supports the capability of a user configuring policy settings through a series of dialog boxes. The dialog boxes are hierarchically organized in accordance with configuration levels, including a system level, an input device level, a display device level, and an output device level, where the configuration levels are associated with the policy levels. The dialog boxes provide a consolidated approach for configuring a color management system by a user.

With another aspect of the invention, an interface is supported, enabling a component, e.g., an application, to send inputs to a color management system in order to configure the policy. An embodiment of the invention supports an application program interface, in which an application may set a policy setting and get (retrieve) a policy setting from the color management system.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
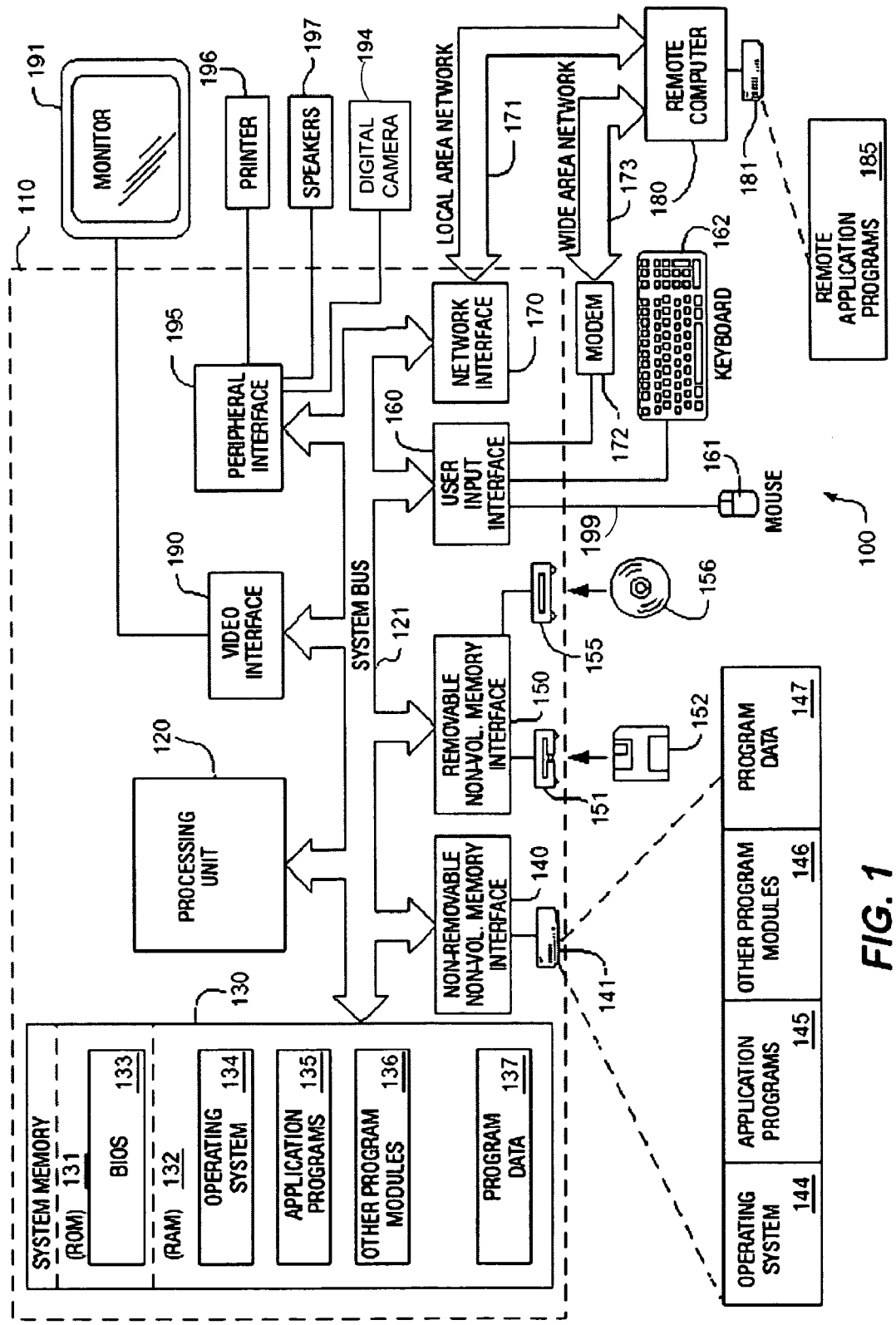
FIG. 1 illustrates an example of a suitable computing system environment on which the invention may be implemented.

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Definitions for the following terms are included to facilitate an understanding of the detailed description.

Channel—Images contain one or more 'channels' of information. Commonly colors are represented by the additive primary colors (red, green and blue). Color information for each of these three colors would be encoded into its own channel. Channels are not limited to RGB—they can be broken into luminance (brightness) and chrominance (color) channels, or other still-more-exotic ways. Channels may also be used to encode things other than color—transparency, for example. A measure of the color quality of an image is the number of bits used to encode per channel (bpch).

Clipping—Any time two different values in the source data are mapped to the same value in the destination data, the values are said to be clipped. This is significant because clipped data cannot be restored to its original state—information has been lost. Operations such as changing brightness or contrast may clip data.

Color Management—Color management is the process of ensuring the color recorded by one device is represented as faithfully as possible to the user preference on a different device, often this is match the perception on one device to another. The sensor of an imaging device will have, when compared to the human eye, a limited ability to capture all the color and dynamic range that the human eye can. The same problem occurs on both display devices and with output devices. The problem is that while all three classes of device have these color and dynamic range limitations, none of them will have limitations in exactly the same way. Therefore conversion 'rules' must be set up to preserve as much of the already limited color and dynamic range information as possible, as well as ensure the information appears as realistic as possible to the human eye, as it moves through the workflow.

Color Space—A sensor may detect and record color, but the raw voltage values have absolutely no meaning without a reference. The reference scale could be the measured capabilities of the sensor itself—if the sensor is measured to have a particular frequency response spectrum, then numbers generated will have meaning. More useful, though, would be a common reference, representing all the colors visible by the human eye. With such a reference (a color space known as CIELAB), a color could be represented unambiguously, and other devices could consume this information and do their best to reproduce it. There are a variety of well-known color spaces, including sRGB, scRGB, AdobeRGB, each developed for specific purposes within the world of imaging.

Color Context—A generalized form of a gamut in a described color space. While certain file formats make use of gamut information as described by a particular color management standard, a color context is effectively the same concept but includes those file (encoding) formats which do not support ICC gamuts.

Dynamic Range—Mathematically, the largest value signal a system is capable of encoding divided by the smallest value signal that same system is capable of encoding. This value gives a representation of the scale of the information the system will encode.

Gamut—The range of colors and density values reproducible in an output device such as printer or monitor Hue—An attribute of a color by which a person perceives a dominant wavelength.

Hue Saturation Value (HSV)—A hue diagram representing hue as an angle and saturation as a distance from the center.

ICC—International Color Consortium

Intensity—The sheer amount of light from a surface or light source, without regard to how the observer perceives it.

Precision—An accuracy of representing a color. The accuracy typically increases by increasing the number of bits that is encoded with each channel, providing that the source data has adequate color resolution.

Profile—A file that contains enough information to let a color management system convert colors into and out of a specific color space. This may be a device's color space—in which we would call it a device profile, with subcategories input profile, output profile, and display profile (for input, output, and display devices respectively); or an abstract color space.

Rendering Intent—The setting that tells the color management system how to handle the issue of converting color between color spaces when going from a larger gamut to a smaller one.

Saturation—The purity of color.

sRGB—A "standard" RGB color space intended for images on the Internet, IEC 61966-2-1 scRGB—"standard computing" RGB color space, IEC 61966-2-2

Workflow—A process of defining what colors that the numbers in a document represent and preserving or controlling those colors as the work flows from capture, through editing, to output.

FIG. 1 illustrates an example of a suitable computing system environment 100 on which the invention may be implemented. In particular, FIG. 1 shows an operation of a wireless pointer device 161, e.g. an optical wireless mouse, in the context of computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad. In an embodiment of the invention, wireless pointing device 161 may be implemented as a mouse with an optical sensor for detecting movement of the mouse. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). In FIG. 1, wireless pointer 161 communicates with user input interface 160 over a wireless channel 199. Wireless channel 199 utilizes an electromagnetic signal, e.g., a radio frequency (RF) signal, an infrared signal, or a visible light signal. A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A peripheral interface 195 may interface to a video input device such as a scanner (not shown) or a digital camera 194, where output peripheral interface may support a standardized interface, including a universal serial bus (USB) interface. Color management, which may be supported by operating system 134 or by an application 135, assists the user in obtaining a desired color conversion between computer devices. The computer devices are typically classified as input devices, e.g., digital camera 194, display devices, e.g., monitor 191, and output devices, e.g., printer 196. Operation of color management is explained in greater detail in the following discussion.

Figure 2:
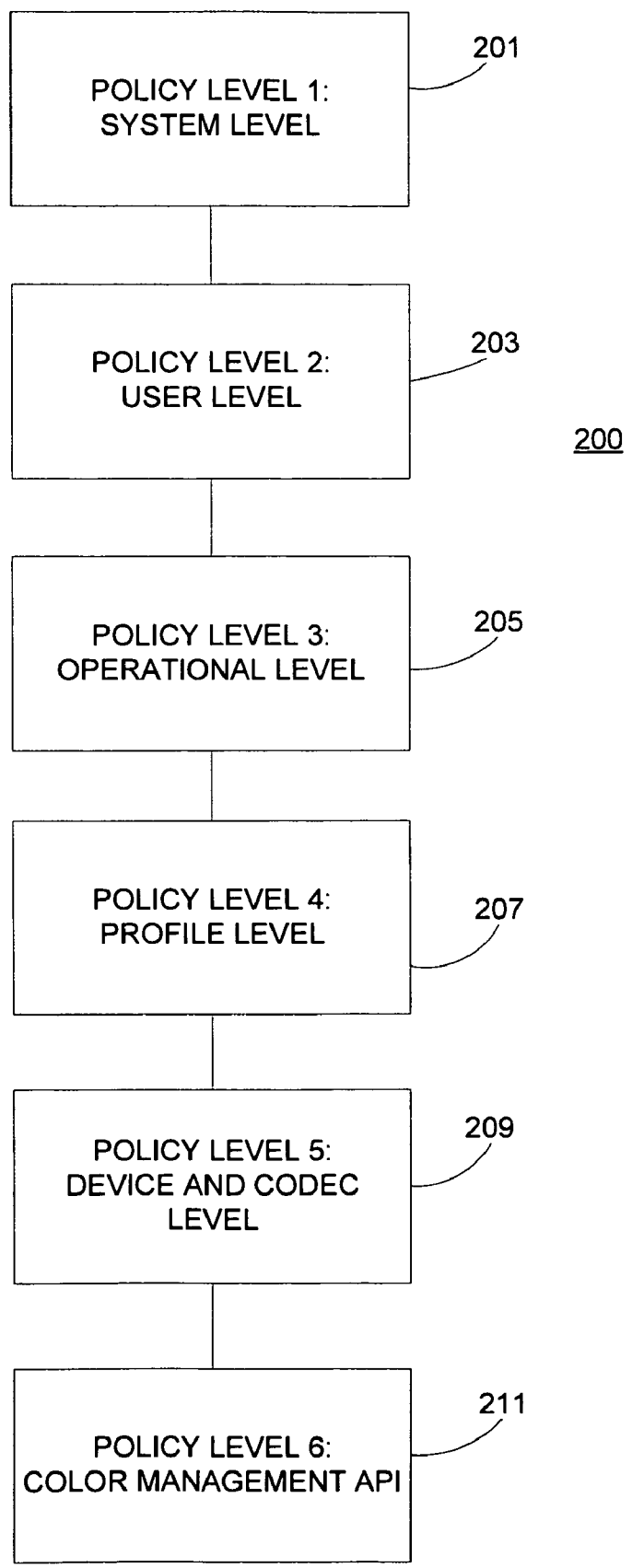
FIG. 2 illustrates a hierarchical relation among policy levels in accordance with an embodiment of the invention.

FIG. 2 illustrates a hierarchical relation 200 among policy levels that is supported by a color management system in accordance with an embodiment of the invention. Relation 200 comprises six policy levels 201-211. Policy level 201 (level 1—system level) is the highest and coarsest level of control, spanning system-wide color management control. In the embodiment, the color management system maintains two working spaces (where a working space may be referred as a profile connection space): a small working space and a large working space. The small working space is a traditional 8-bpch (bit per channel) color space that keeps an image file's size to a minimum at the expense of color fidelity and dynamic range. The small working space is sRGB by default. The large working space is a high-fidelity working space. The large working space is typically greater than 8-bpch to preserve the image file's quality at expense of increasing the file's size and operation speed. The large working space is scRGB (32-bpch, floating point) by default.

The color management system supports three quality settings for specified gamut mappings in converting an image file to either the small working space or the large working space as shown in Table 1. The first quality setting Q1 (optimize for size) optimizes a conversion so that a specified gamut mapping (as discussed with rendering

TABLE 1

QUALITY SETTINGS

| QUALITY SETTING | MAPPING TO WORKING SPACE |
| --- | --- |
| Q1 | Optimize for size |
| Q2 | Ensure no loss |
| Q3 | Optimize for quality | intent as will be discussed) converts an image file to the small working space. All operations on the image file are performed in the small working space. The limited 8-bpch fidelity of the small working space generally is associated with a large dynamic range (large gamut) or high color fidelity but not both. The image file may experience reduced fidelity if the image file is processed significantly. Image files having more than 8-bpch are scaled down to 8-bpch. With the second quality setting Q2 (ensure no loss), an image file having 8-bpch data or less is converted to the small working space. An image files with more than 8-bpch data is mapped to the large working space. As a result, an image file is typically characterized by the quality benefits of the third quality setting Q3 (as explained below) but requires more memory resources than with the first quality setting. With the third quality setting Q3 (optimize for quality), the color management system converts all image files to the large working space so that all operations on an image file are performed in the large working space. If the large working space is configured for the scRGB color space, the image file has greater immunity to clipping with super/sub-luminal value support, maintenance of fidelity due to high-color precision, and faithful color reproduction. However, the processing of an 8-bpch image file requires a memory footprint four times larger than with the first or second quality setting (Q1 or Q2).

With the first and third quality settings (Q1 and Q3), the conversion of an image file may require that the image file be converted to a corresponding smaller working space (e.g., an image space having a scRGB color space being converted to the small working space) or to a larger working space (e.g., an image space having a RGB color space converted to the large working space). In such cases, a rendering intent setting indicates to the color management system how to handle the issue of converting color between color spaces when going from a larger gamut to a smaller one as shown in Table 2. When converting

TABLE 2

RENDERING INTENTS

| COMPARISON OF GAMUT SPACES A, B | CONDITION |
| --- | --- |
| A > B | A encompasses B |
| A < B | A is fully enclosed by B |
| A has an intersection with B | Neither A or B enclose the other |
| A independent of B | No commonality | from gamut A to gamut B, the color spaces of the gamuts should be considered. It the color spaces are not the same, the color spaces should be converted to an intermediate space. Gamut A is compared with gamut B, in which four possible conditions exist. First, gamut space A is larger than gamut B, where gamut A fully encompasses gamut B. Second, gamut A is smaller than gamut B, where gamut A is fully enclosed by gamut B. Third, gamut A has an intersection with gamut B, where neither gamut fully encloses the other gamut. Fourth, gamut A is independent of gamut B, where there is not commonality between gamuts.

In another embodiment of the invention, binary gamut mapping operations are supported. For example, a camera manufacturer may provide a source profile and a source gamut map to replicate the camera's "look and feel", while a printer manufacturer may provide a destination profile and a destination gamut map to replicate the printer's "look and feel". In the embodiment, a color management system supports the capability of selecting the following choices:

choosing the source gamut map choosing the destination gamut map overriding either or both the source gamut map and the destination gamut map weight ratio (0-100%) of the combination of the source map and the destination map.

In some cases, a user may disable color management in its entirety so that color spaces may be meaningless. However, there are mappings that are meaningful with the activation of color management. In such cases, simple arithmetic operations are executed without a traditional color managed context. An example is the conversion from 3-channel RGB to 4-channel CMYK.

Referring to FIG. 2, a user may disable color management entirely or select the small working space and the large working space at policy level 201 (system level). A lower level policy level (i.e. policy level 203, 205, 207, 209, or 211) may override policy level 201. However, policy level 201 may lockout the ability of a lower policy level from overriding policy 201. Moreover, the override/lockout mechanisms may be configured with other policy levels. Each policy level 201, 203, 205, 207, and 209 has a locking function to provide the user control over whether a lower policy level may override the settings of the policy level, whether or not to prompt the user, or simply carry out the request in accordance with the user's instructions.

At policy level 203 (user level), the user can configure policy for the user without affecting policy for other users. This capability may be important if the color management system supported by a computer system (e.g., computer 110) is used by a plurality of users such in an educational system.

At policy level 205 (operational level), the user has the ability of controlling color management based upon the operation being supported by the color management system. (As will be explained with FIG. 3, operations include "capture", "display", "print", "load", and "save", "copy" and "paste".) For example, when loading an image file is being performed, the color management system may be configured to always convert the image file to scRGB. When printing an image file, the color management system may be configured to convert the image file go Epson 9600—Premium Luster. Policies can be configured for each designated operation.

At policy level 207 (profile level), the user has the ability to control color management based on an image file's embedded profile or a lack of an embedded profile. The user may desire to perform a certain conversion when certain policies are encountered.

At policy level 209 (device and codec level), the user can control conversions by the color management system according to the device and then to codec (format of image file).

At policy level 211 (color management API), an application may make an API call directly to the color management API to perform a color operation. (The color management API is discussed in more detail with FIGS. 14 and 15.) In the embodiment, policy level 209 is not typically exposed to the user.

Figure 3:
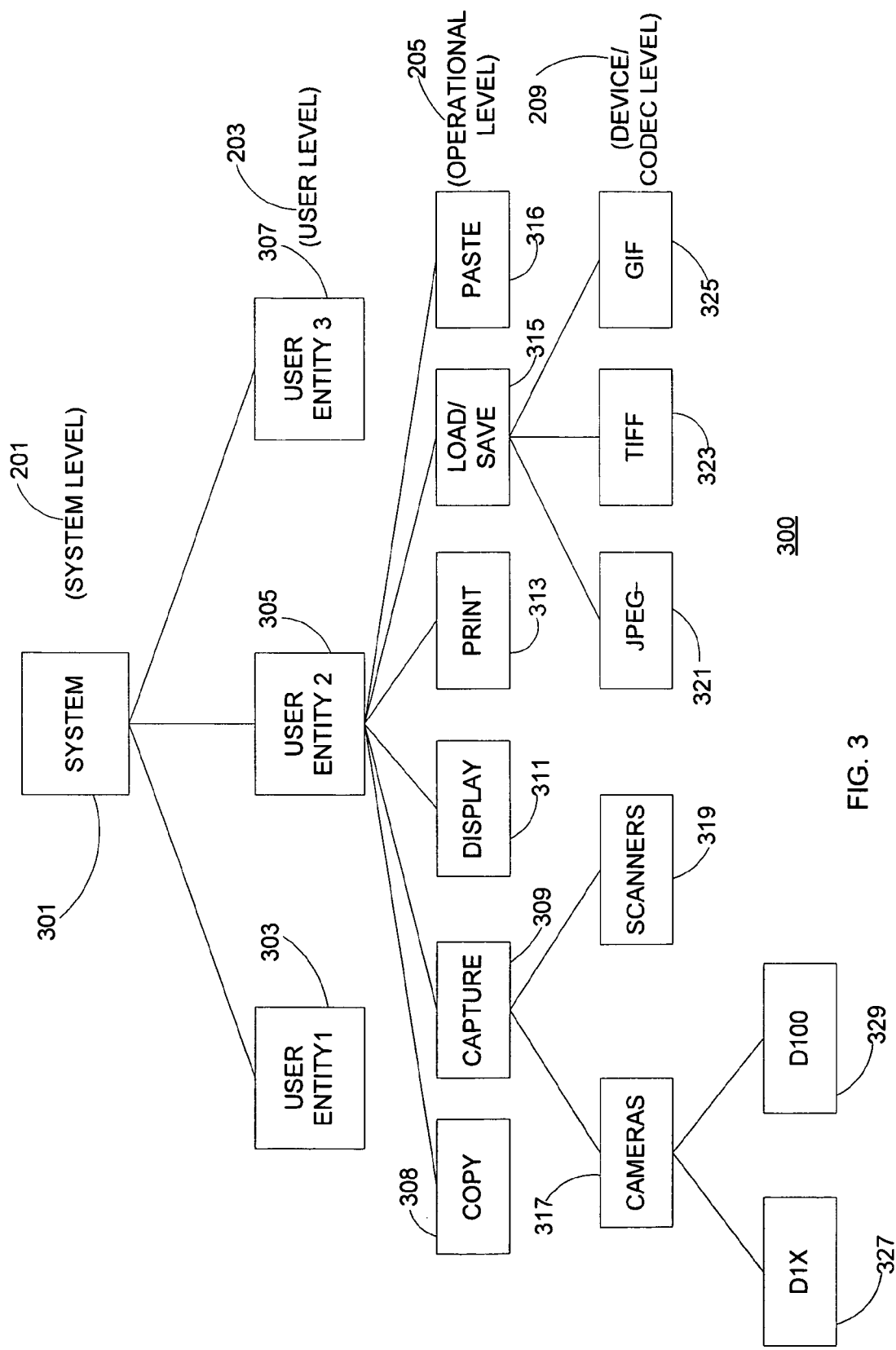
FIG. 3 illustrates a schema of a hierarchical policy schema in accordance with an embodiment of the invention.

FIG. 3 illustrates a schema of a hierarchical policy schema 300 corresponding to policy levels 201, 203, 205, and 209. Policy may be established for system 301. If policy is not configured for lower policy levels, then the policy configured at the system level 201 is utilized by the color management system. However, a lower level policy can override the policy set by policy level 201 if policy level 201 does not lockout the lower level policy.

In the schema shown in FIG. 3, each of three user entities 303, 305, and 307, as associated with user level 203, may correspond to different users of computer 110, in which each user may configure policy for the user's environment without affecting other users. However, in other embodiments user entities 303, 305, and 307 may correspond to other associations. For example, user entities 303, 305, and 307 may correspond to different customers of a user, where each customer has different color management objectives that require different policy settings.

Capture operation 309, display operation 311, print operation 313, load/save operation 315, copy operation 308, and paste operation 316 are associated with operational level 205, in which policy configuration settings are contingent on the type of operation. Each operation is hierarchically associated with devices that can support the operation.

Different devices can be configured with different policy settings at device/codec level 209. For example, capture operation 309, as shown in FIG. 3, can be associated with a plurality of input devices e.g., cameras 317 and scanners 319, in which each device type is associated with different policy settings. Load/save operation 315 can be associated with different codec (format) types including JPEG format 321, TIFF format 323, and GIF format 325. Display operation 311 may be associated with different monitor devices (not shown). Print operation 313 may be associated with different printer devices (not shown). For each device type, different device models can be configured with specific policy settings. For example, D1X model 327 and D100 model 329 are associated with cameras 317. Although not shown in hierarchical policy schema 300, other embodiments of the invention may support a policy on an application level.

Color management settings, in accordance with schema 300, may be represented in text file, e.g., as an Extensible Markup Language (XML) file in which color management settings for each policy level are represented with at least one attribute. The XML file facilitates configuring the policies on computer 110, if the policy settings become contaminated or to conform to policy settings of another computer.

Figure 4:
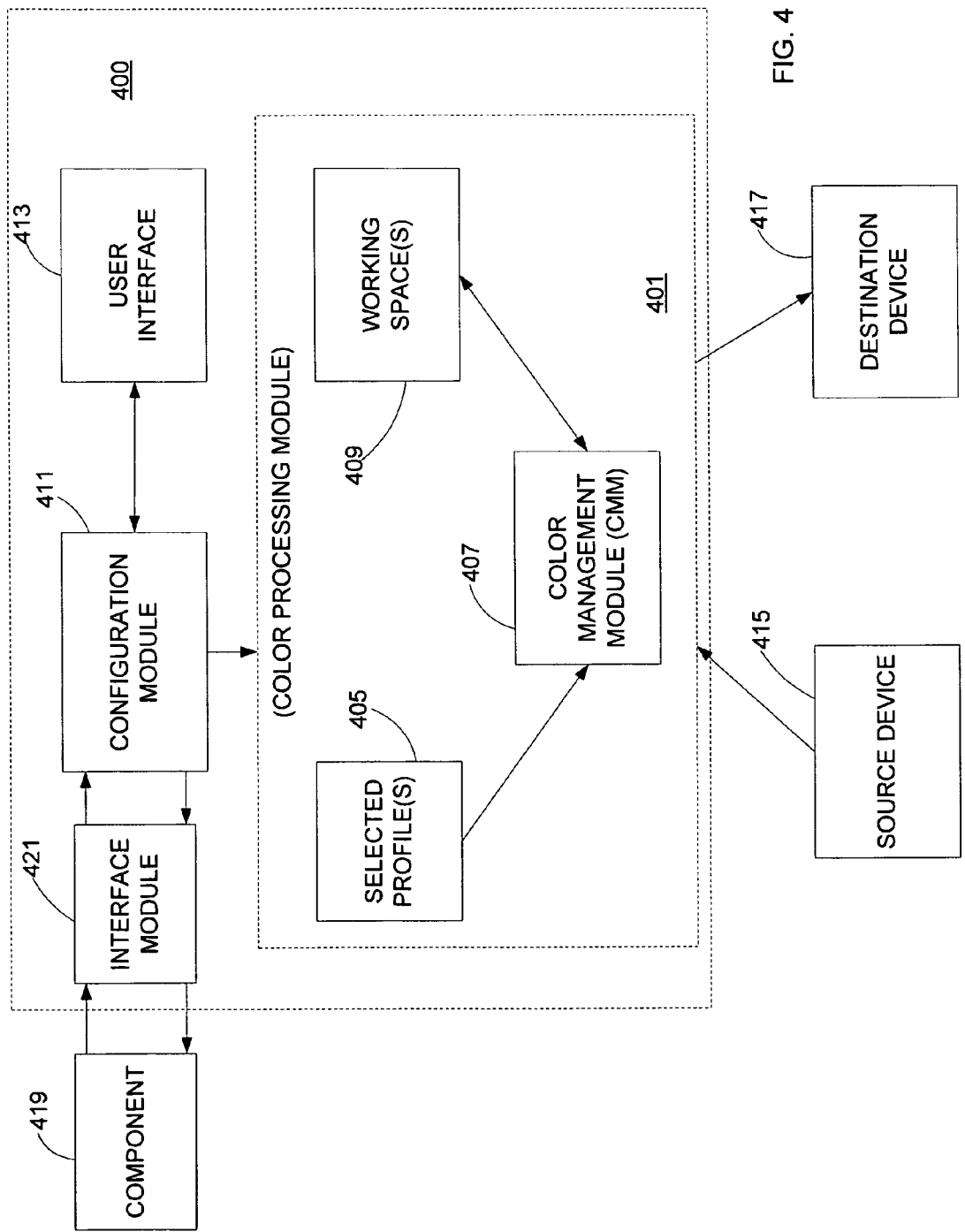
FIG. 4 shows an architecture of a color management system in accordance with an embodiment of the invention.

FIG. 4 shows an architecture of a color management system 400 in accordance with an embodiment of the invention. Color management system 400 comprises color processing module 401, configuration module 411, user interface 413, and interface module 421. Color processing module 401 comprises color management module (CMM) 407, selected profiles 405, and working space 409. (In some embodiments, color management system 400 may select from one of a plurality of color management modules as configured by policy settings by configuring policy settings through configuration module 411.) Color management module 407 is a software engine that converts the RGB or CMYK values using the color data in selected profile 405. A profile may be associated with source device 415 (e.g., a digital camera) while another profile may be associated with destination device 417. However, with some types of devices, e.g., as a display device, a profile may be two-way (i.e., converting from the device space to the working space and from the working space to the device space) because a display device may function as both an input and an output device. A profile may be assumed and selected by color management system 400 or may be obtained from an image file if the profile is embedded in the image file. Using profile 405, color management module 407 determines how colors are computed in working space 409 using the sample points from profile 405. Color management module 407 typically performs interpolation between the profile sample points to determine the values in working space 409, which may be referred as a profile connection space (PCS). Working space 409 may be a large working space or a small working space as determined by gamut mapping in accordance with policy settings that are obtained from configuration module 411 from user interface 413. A user can configure policy settings through user interface 413 by interacting with a series of dialog boxes. (Configuring policy settings is discussed in more detail with FIGS. 5-12.) Configuration module 411 utilizes the inputted policy settings to configure color management system 400. Alternatively, as will be discussed with FIGS. 14 and 15, configuration module 411 may receive a policy setting that is contained in an input from component 419 through interface module 421. In an embodiment, component 419 is an application that utilizes application program interface (API) calls to set or to get policy settings from color management system 400.

Using the interpolation algorithm defined by color management module 407, color management system 400 builds a table for source device 415 and a table for destination device 417. Color management system 400 connects the two tables together through common working space values and builds a combined table that goes directly from source device 415 and destination device 417. Color management system 400 then passes each pixel in the source image through the combined table, converting the values from source to destination.

A color management system (e.g., color management system 400) allows for robust color management by permitting a user to monitor, inspect, interrogate, correct, modify, and/or ignore, a color management workflow. By use of choke points, the color management system assures a user of what color management has been or will be performed, when color management was or will be performed, and by whom color management has, will, or should be performed. A choke point is defined as a predefined contact point for a certain operation where all pixels of color object data are sent through one function in a very limited fixed set of exclusive functions. In the embodiment, choke points are implemented as disclosed in a patent application Ser. No. 10/683,153 entitled "COLOR MANAGEMENT SYSTEM THAT ENABLES DYNAMIC BALANCING OF PERFORMANCE WITH FLEXIBILITY", filed Oct. 14, 2003, wherein the patent application is incorporated by reference in its entirety.

Figure 5:
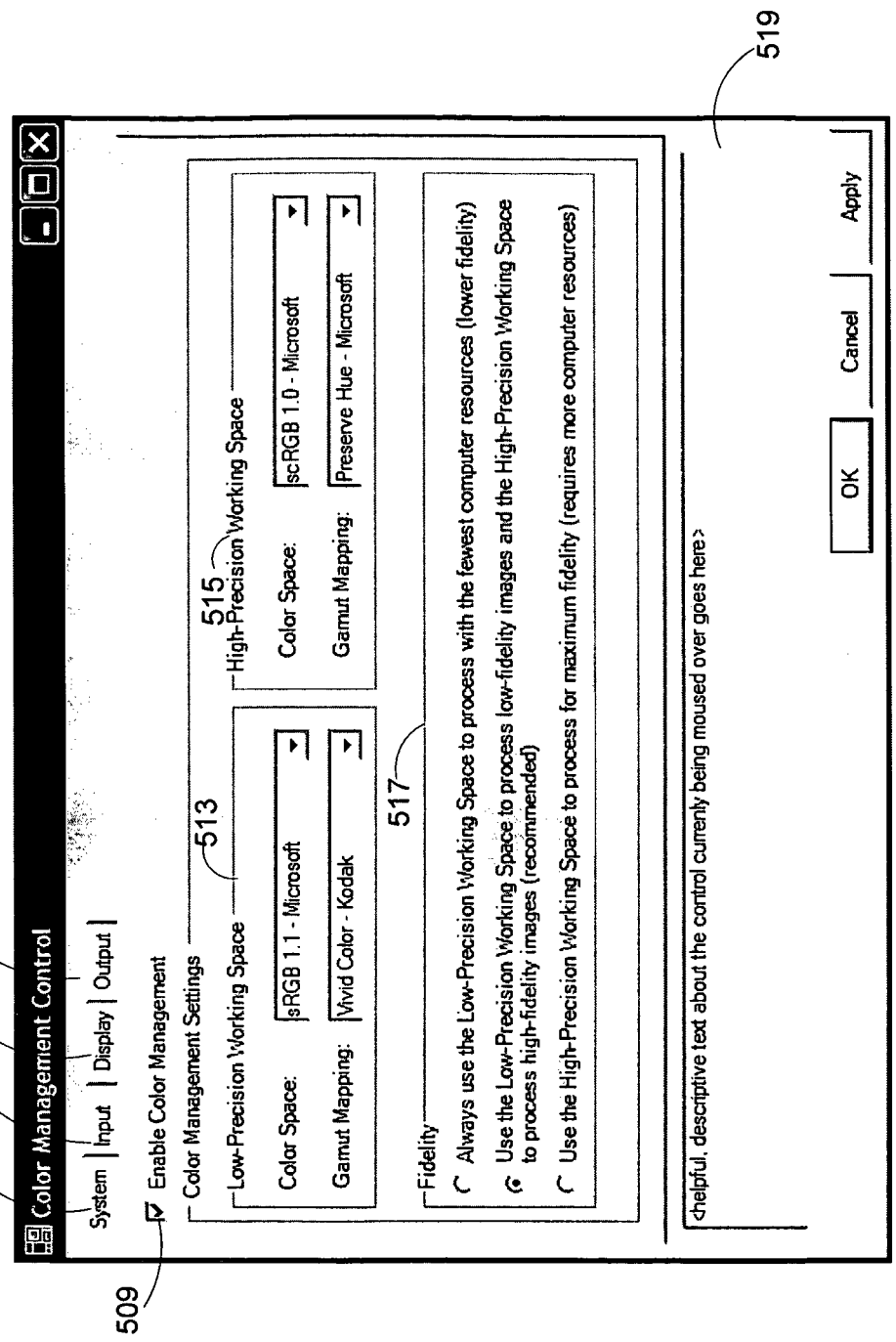
FIG. 5 illustrates a dialog box for setting policy at a system level in accordance with an embodiment of the invention.

FIG. 5 illustrates a dialog box 500 for setting policy at a system configuration level in accordance with an embodiment of the invention. Dialog box 500 is displayed in response to a user selecting system tab 501. Other configuration levels include input configuration level (corresponding to tab 503), display configuration level (corresponding to tab 505), and output configuration level (corresponding to tab 507). In other embodiments, a different configuration level may be selected through a different configuration indicator, e.g., radio buttons. In the embodiment, the system configuration level corresponds to system policy level 201 as shown in FIG. 2. The user can globally enable color management for the system by selecting "enable color management" object 509. The user specifies a low-precision working space (small working space) through "low-precision working space" object 513 and a high-precision working space (large working space) through "high-precision working space" object 515. The user specifies a system-wide gamut mapping algorithm through "fidelity" object 517. The selections provided with object 517 are consistent with quality settings as previously discussed. Also, descriptive text object 519 provides the user assistance and guidance when navigating through the different dialog boxes.

In some embodiments, dialog 500 provides a plurality of user tabs so that another dialog box (not shown) can be displayed, in which the corresponding user may enter policy settings that pertain only to the user and not to other users. This capability may be useful in a computer system that is shared by a plurality of users.

Figure 6:
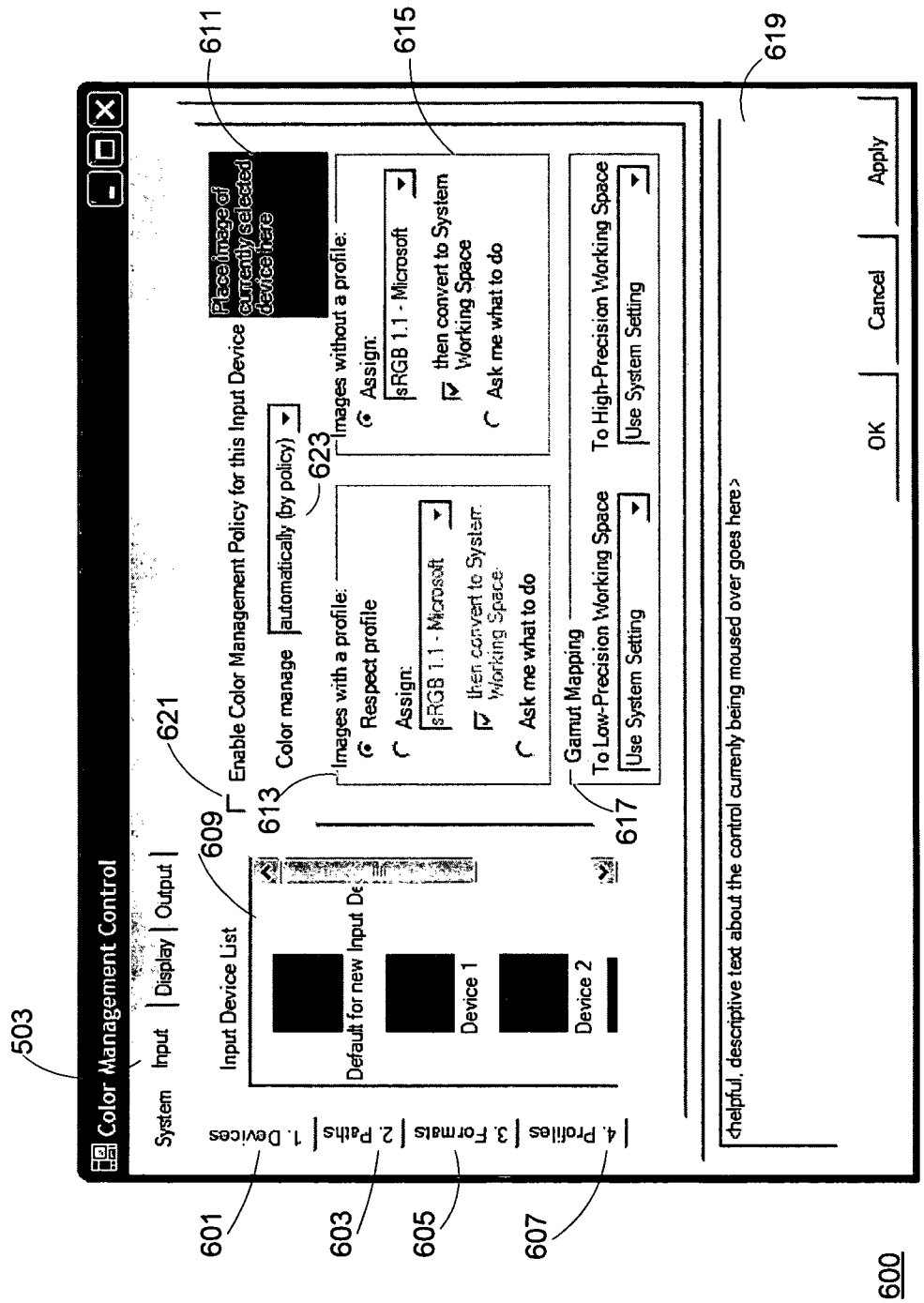
FIG. 6 illustrates a dialog box for setting policy at an input device level in accordance with an embodiment of the invention.

FIG. 6 illustrates a dialog box 600 for setting policy at an input device configuration level in accordance with an embodiment of the invention. Dialog box 600 is displayed in response to the user selecting input configuration tab 503 and device priority tab 601. Other priority input tabs include paths priority tab 603, formats priority tab 605, and profiles priority tab 607 which, if selected by the user, corresponds to dialog boxes 700, 800, and 900, respectively. The order of priority (from highest to lowest priority) for priority input indicators (corresponding to priority input tabs) is "devices" followed by "paths" followed by "formats" followed by "profiles". Incoming images are matched against higher priority rules before lower priority rules.

"Input device list" object 609 is a list is devices capable of delivering images to a computer, e.g., computer 110. Object 611 displays the input device selected from object 609. "Enable color management policy for this input device" object 621 is a global setting for the device. When object 621 is cleared, all other controls (not shown) are disabled, and the device is not included in the set of rules that are applied against incoming images.

"Color manage" object 623 indicates whether color management system 400 silently handles color management or whether the user should be prompted at run-time for color management decisions. If object 623 is set to "manual", the remaining controls on the tab are disabled (not shown). As shown in FIG. 6, when object 623 is set to "automatically (by policy)", color management decisions are automatically determined in according to the policy.

"Images with a profile" object 613 sets the policy of what to do when an image with an embedded profile is encountered. If object 613 is set to "Respect profile", color management system 400 converts from the color space indicated by the image's profile. If object 613 is set to "Assign", color management system 400 ignores the image's embedded profile and uses the specified profile in lieu of the embedded profile.

"Images without a profile" object 615 set the policy of what to do when an image without a profile is encountered. If object 615 is set to "Assign", color management system 400 uses the specified file and may convert (if selected) the image from the assigned profile color space to the working space. If object 615 is set to "Ask me what to do", color management system 400 prompts the user at the time that the situation is encountered.

"Gamut mapping" object 617 controls how subject elements of a conversion takes place. A list of options is similar (in this embodiment is identical) to the list of options presented in objects 513 and 515 as shown in FIG. 5 with the additional choice of "Use System Setting". Object 619 provides description text that is relevant to dialog box 600.

Figure 7:
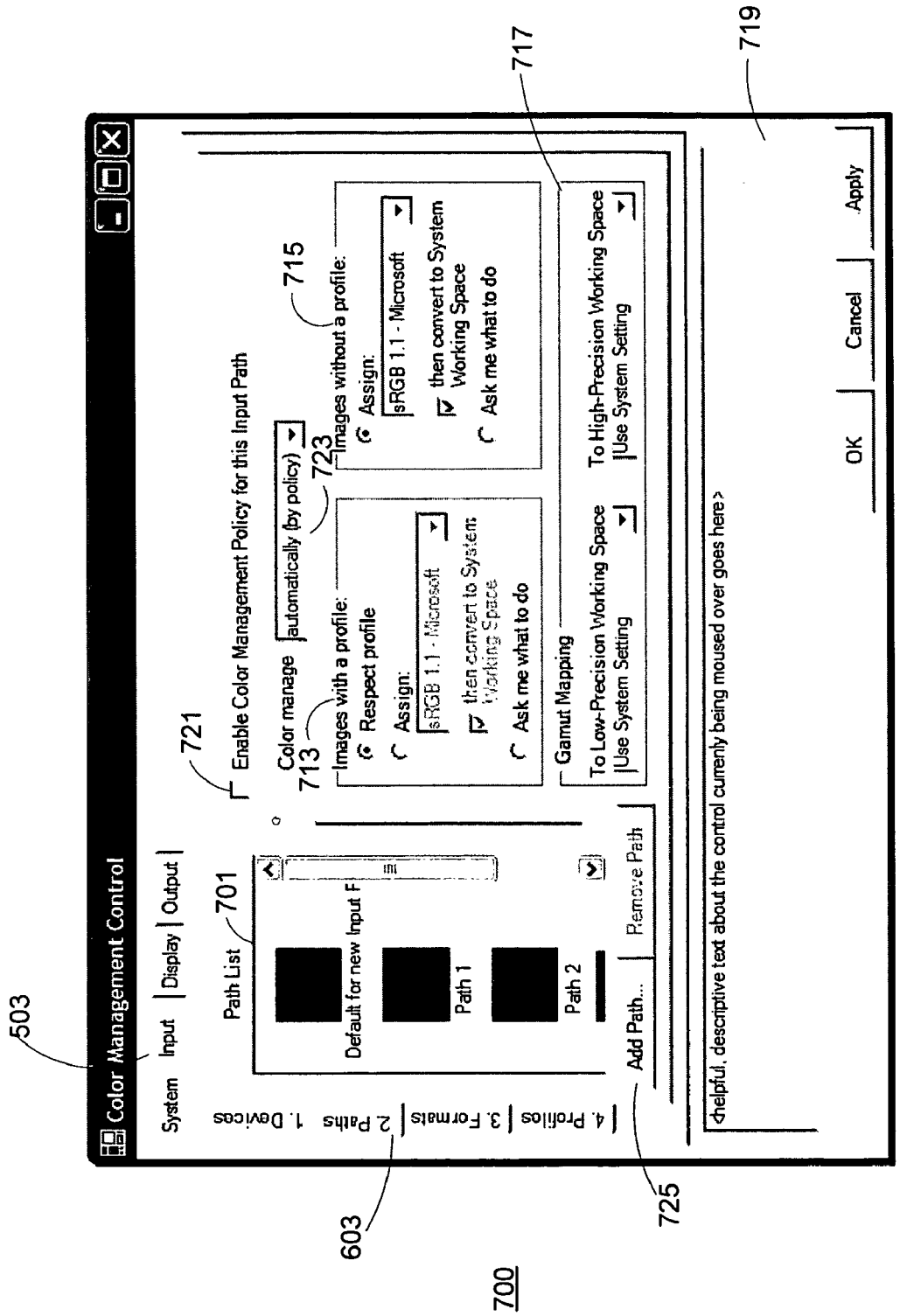
FIG. 7 illustrates a dialog box for setting policy for an input device that is associated with an access path in accordance with an embodiment of the invention.

FIG. 7 illustrates a dialog box 700 for setting policy for an input device configuration level that is associated with an access path in accordance with an embodiment of the invention. Dialog box 700 is displayed in response to the user selecting input configuration tab 503 and paths priority tab 603. Objects 713, 715, 717, 719, 721, and 723 correspond to objects 613, 615, 617, 619, 621, and 623 as shown in FIG. 6. "Path List" object 701 lists the selectable paths for an image file. "Add Path" object 725 enables the user to add a path to "Path List" object 701. Dialog box 700 enables the user to instruct color management system 400 to treat other images (e.g., files in a photographer's image library) to be treated independently from other image files. Also, a path designation may be applied to network imaging devices.

Figure 8:
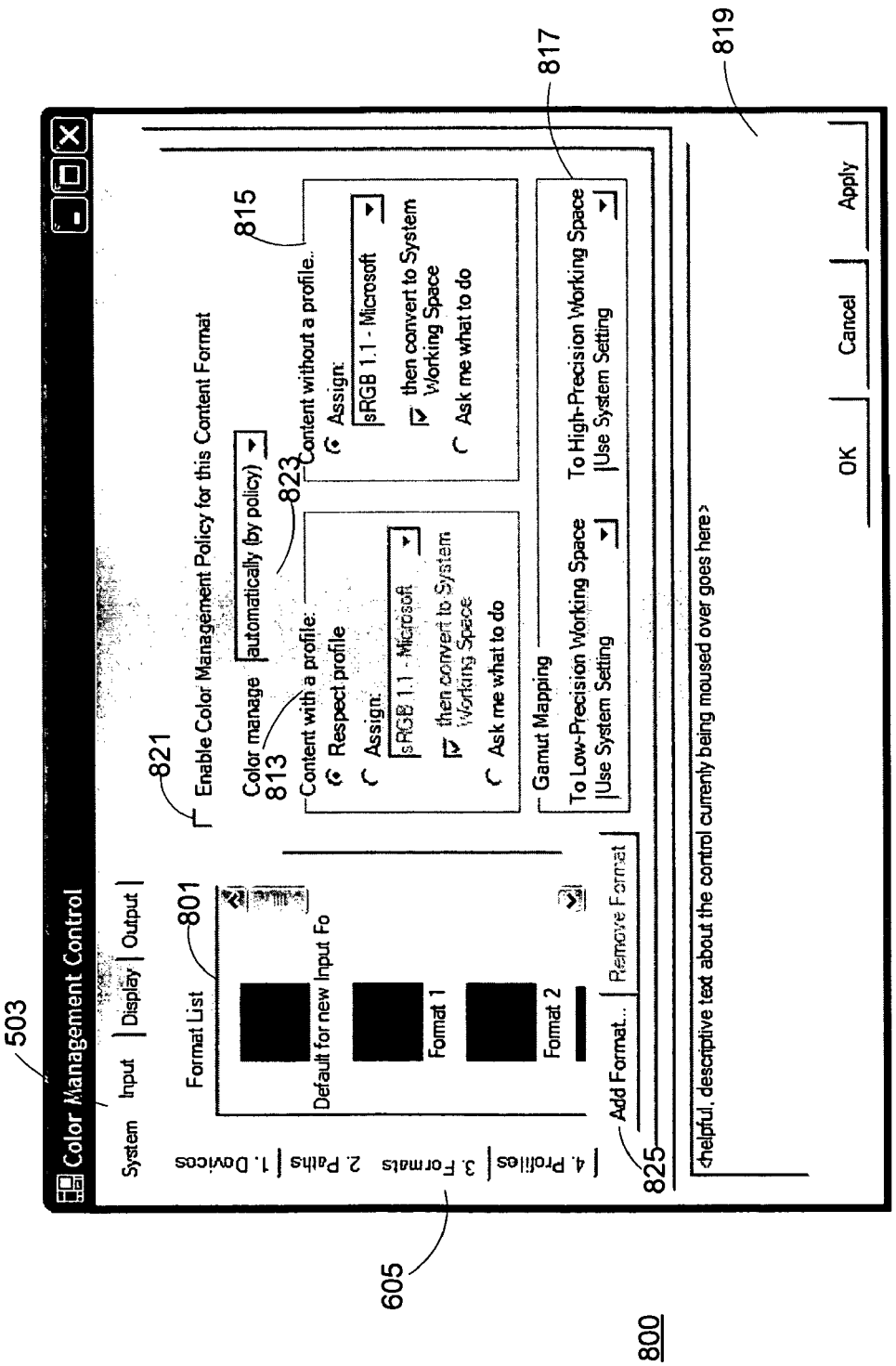
FIG. 8 illustrates a dialog box for setting policy for an input device that is characterized by a format type in accordance with an embodiment of the invention.

FIG. 8 illustrates a dialog box 800 for setting policy for an input device configuration level that is characterized by a format type in accordance with an embodiment of the invention. Dialog box 800 is displayed in response to the user selecting input configuration tab 503 and formats priority tab 605. Objects 813, 815, 817, 819, 821, and 823 correspond to objects 613, 615, 617, 619, 621, and 623 as shown in FIG. 6. "Format List" object 801 lists the selectable image file formats (which may be referred as codecs). Format types include TIFF (tagged image file format), JPEG (Joint Photographic Experts Group), and GIF (graphics interchange format). "Add Format" object 825 enables the user to add a format to "Format List" object 801.

Figure 9:
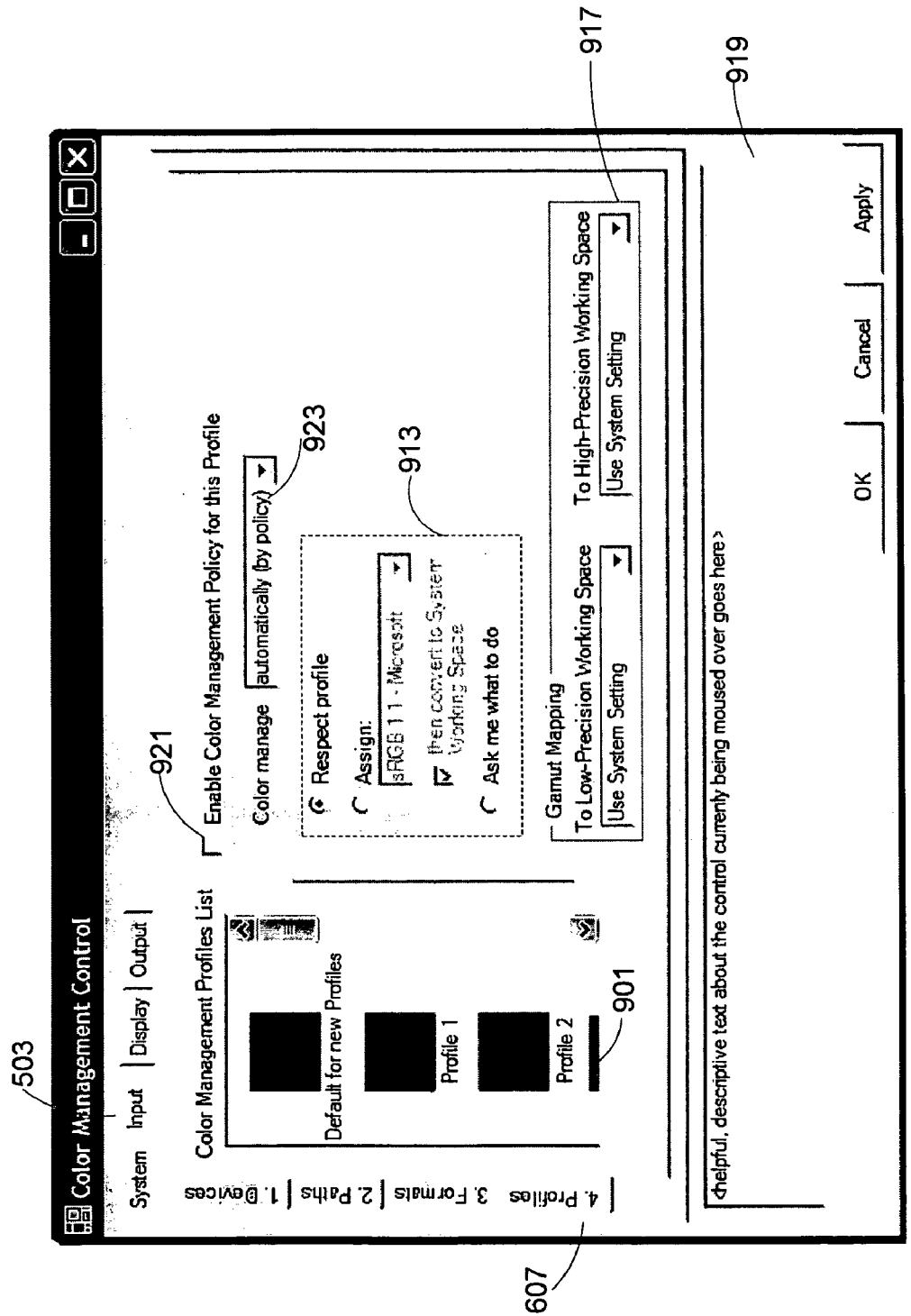
FIG. 9 illustrates a dialog box for setting policy for an input device that is associated with a profile in accordance with an embodiment of the invention.

FIG. 9 illustrates a dialog box 900 for setting policy for an input device configuration level that is associated with a profile in accordance with an embodiment of the invention. Dialog box 900 is displayed in response to the user selecting input configuration tab 503 and profiles priority tab 607. Objects 913, 917, 919, 921, and 923 correspond to objects 613, 615, 617, 619, 621, and 623 as shown in FIG. 6. "Color Management Profiles List" object 1001 lists profiles that may be embedded in an image file.

Figure 10:
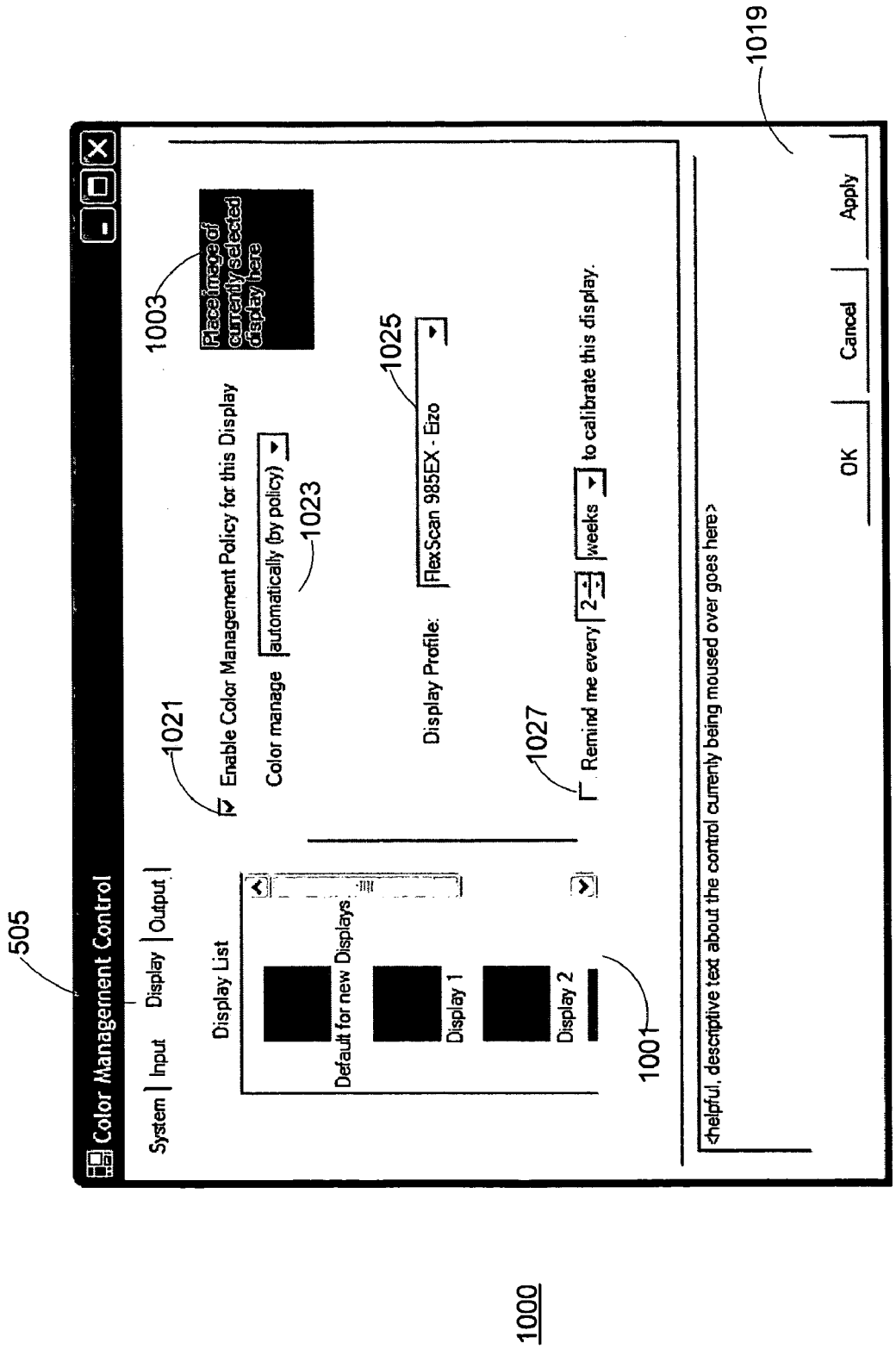
FIG. 10 illustrates a dialog box for setting policy for a display device in accordance with an embodiment of the invention.

FIG. 10 illustrates a dialog box 1000 for setting policy for a display device configuration level in accordance with an embodiment of the invention. Dialog box 1000 is displayed in response to the user selecting display configuration tab 505. Objects 1019, 1021, and 1023 correspond to objects 619, 621, and 623 as shown in FIG. 6. "Display list" object 1001 lists display devices that may be selected by the user. The selected display device is displayed in object 1003. Object 1025 enables the user to select the corresponding profile for the selected display device. Additionally, the user may be reminded to periodically recalibrate the display device in accordance with the selection from object 1027.

Figure 11:
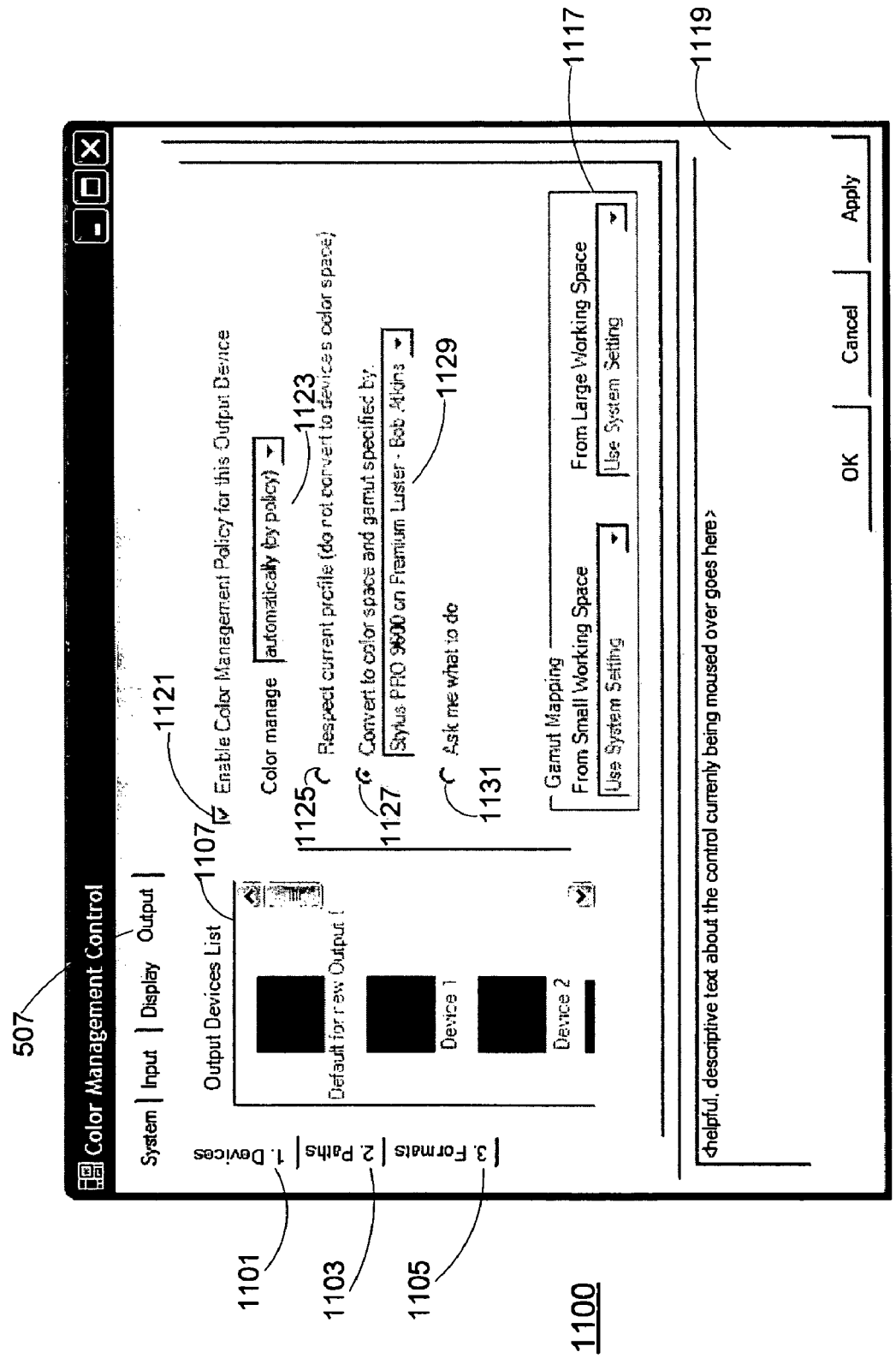
FIG. 11 illustrates a dialog box for setting policy for an output device in accordance with an embodiment of the invention.

FIG. 11 illustrates a dialog box 1100 for setting policy for an output device configuration level in accordance with an embodiment of the invention. Dialog box 1100 is displayed in response to the user selecting output configuration tab 507 and devices priority tab 1101. "Output Devices List" object 1107 lists the output devices that the user can select. Objects 1117, 1119, 1121, and 1123 correspond to objects 617, 619, 621, and 623 as shown in FIG. 6. Objects 1125, 1127, 1129, and 1131 enable the user to specify whether to use the current profile of the output device, to specify another profile, or to ask the user whenever the situation is encountered.

Figure 12:
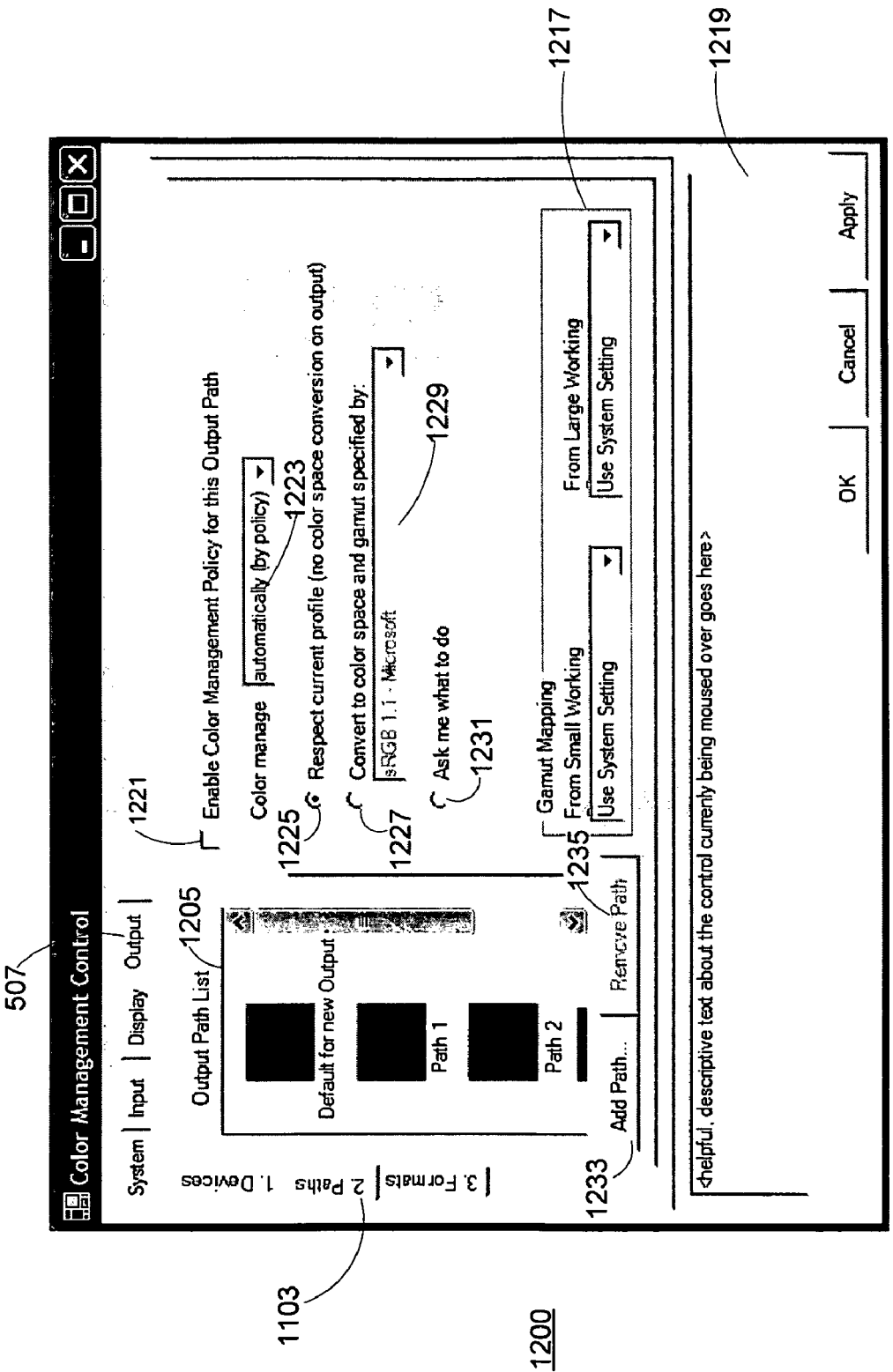
FIG. 12 illustrates a dialog box for setting policy for an output device that is associated with an access path in accordance with an embodiment of the invention.

FIG. 12 illustrates a dialog box 1200 for setting policy for an output device configuration level that is associated with an access path in accordance with an embodiment of the invention. Dialog box 1200 is displayed in response to the user selecting output configuration tab 507 and paths priority tab 1103. "Output Path List" object 1205 lists the output paths that the user can select. The user can add a path through "add path" object 1233 or remove a path through "remove path" object 1235. Objects 1117, 1119, 1121, and 1123 correspond to objects 617, 619, 621, and 623 as shown in FIG. 6. Objects 1225, 1227, 1229, and 1231 correspond to objects 1125, 1127, 1129, and 1131 as shown in FIG. 11.

Figure 13:
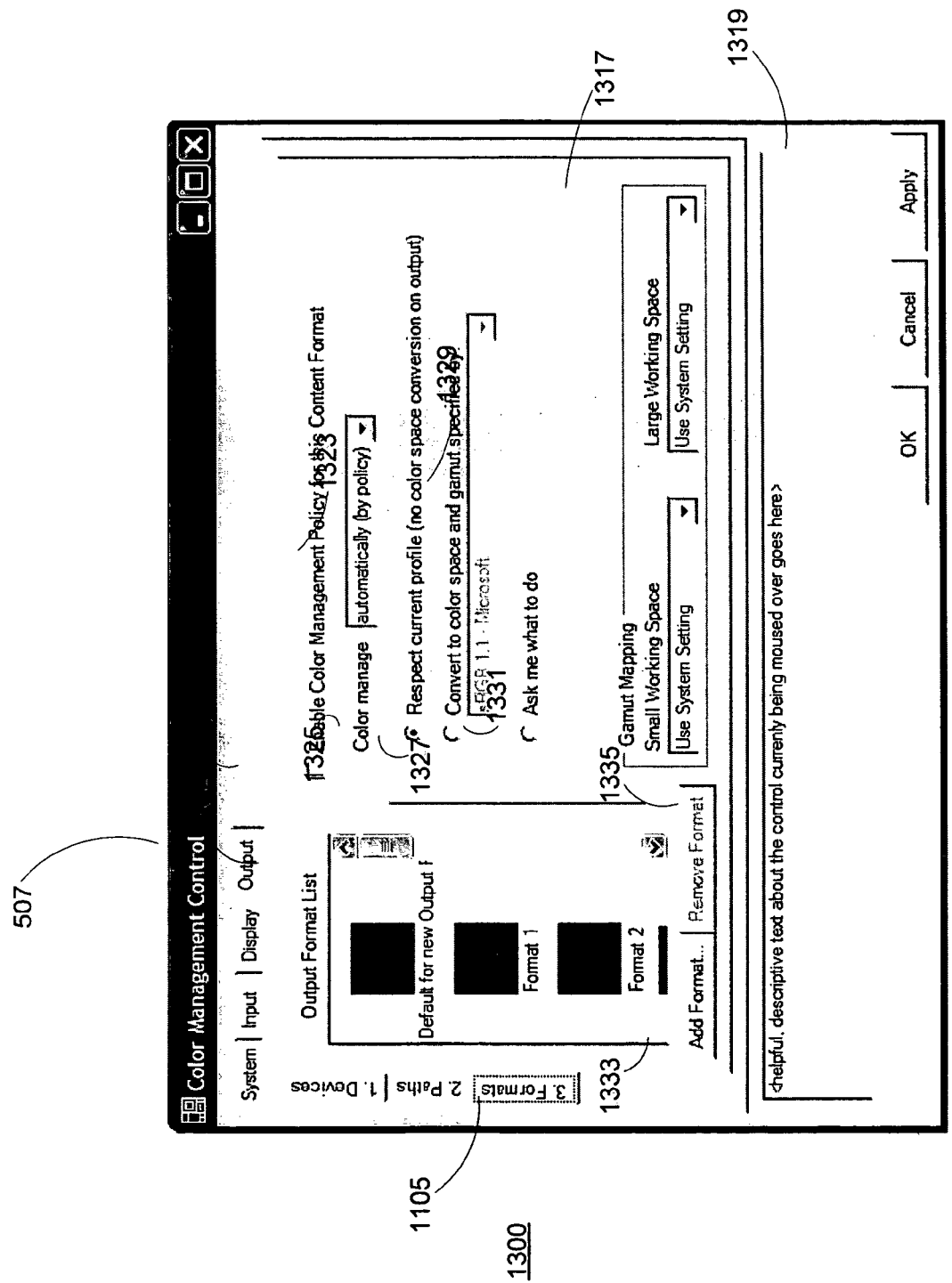
FIG. 13 illustrates a dialog box for setting policy for an output device that is characterized by a format type in accordance with an embodiment of the invention.

FIG. 13 illustrates a dialog box 1300 for setting policy for an output device configuration level that is characterized by a format type in accordance with an embodiment of the invention. Dialog box 1300 is displayed in response to the user selecting output configuration tab 507 and formats priority tab 1105. "Output Format List" object 1305 lists the formats (similar to the formats discussed in FIG. 8) that the user can select. The user can add a format through "Add Format" object 1333 and remove a format through "Remove Format" object 1335. Objects 1117, 1119, 1121, and 1123 correspond to objects 617, 619, 621, and 623 as shown in FIG. 6. Objects 1325, 1327, 1329, and 1331 correspond to objects 1125, 1127, 1129, and 1131 as shown in FIG. 11.

While dialog boxes 500-1300 imply a mapping between different configuration levels 501-507, as shown in FIGS. 5-13, and policy levels 201-211, as shown in FIGS. 2-3, other embodiments of the invention may utilize a different mapping between the configuration levels and the policy levels.

Figure 14:
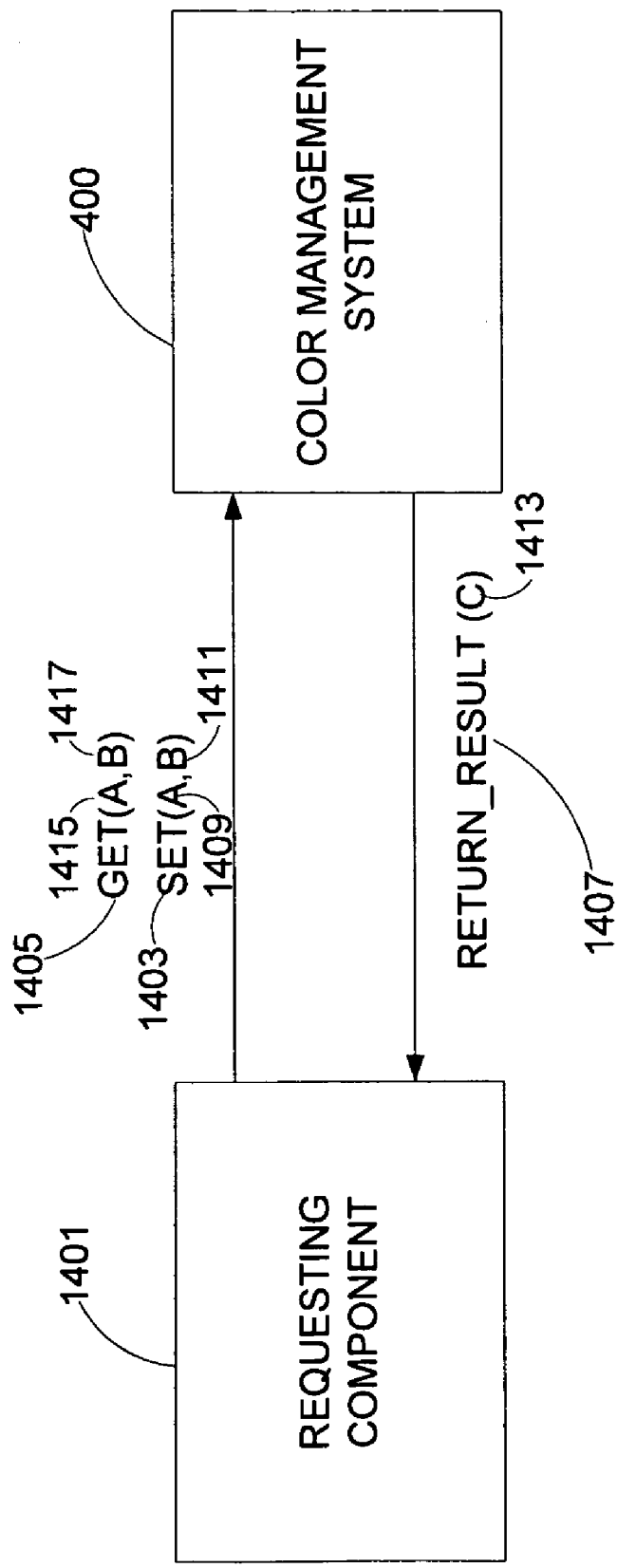
FIG. 14 illustrates a component utilizing an application program interface (API) call to a color management system in accordance with an embodiment of the invention.

FIG. 14 illustrates a requesting component 1401 utilizing a program interface call to a color management system 400 in accordance with an embodiment of the invention. In the embodiment, requesting component 1401 is an application, although with other embodiments, requesting component 1401 may be integrated within peripheral hardware to computer 110 or may be integrated within operating system 134 as shown in FIG. 1.

Requesting component 1401 may configure color management system 400 by setting policy settings that may be similar to the policy settings described in FIGS. 5-13 (corresponding to dialog boxes 500-1300) in which a user inputs the policy settings through user interface 413 and configuration module 411 as shown in FIG. 4. A policy setting may correspond to different objects in FIGS. 5-13, e.g., the specification of color spaces and gamut mappings. Requesting component 1401 sends an input 1403 (which is API call SET (A,B) 1403 in the embodiment shown in FIG. 14) to color management system 400. Input 1403 contains parameter 1409 (which corresponds to a value of a policy setting) and parameter 1411 (which corresponds to an associated configuration level). In response to input 1403, color management system 400 returns a result (corresponding to RETURN RESULT 1407), where parameter 1413 is indicative whether the value of the policy setting was successfully updated.

Also, requesting component 1401 may send an input 1405 (which is API call GET (A,B) in the embodiment) to color management system 400 to obtain the current value of a policy setting. Parameter 1409 corresponds to an identification of a policy setting and parameter 1411 corresponds to an associated configuration level. In response to input 1405, color management system 400 returns a result (corresponding to RETURN RESULT 1407), where parameter 1413 is indicative of the value of the policy setting.

Figure 15:
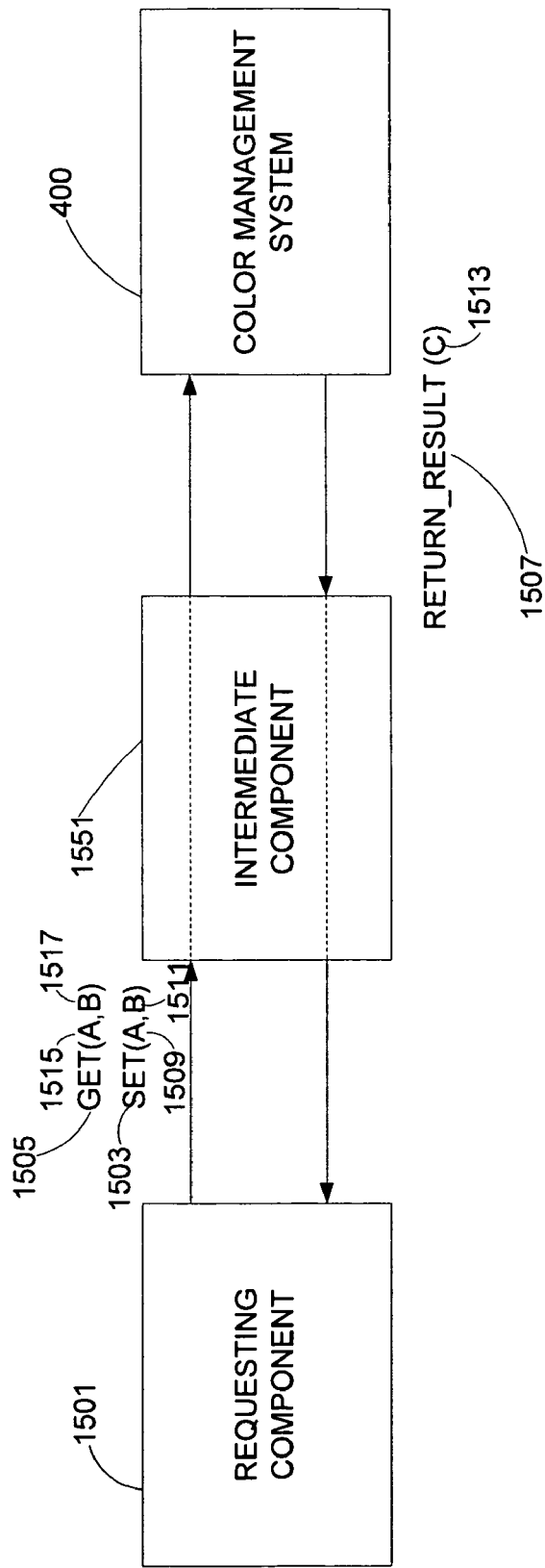
FIG. 15 illustrates a requesting component utilizing an application program interface (API) call to a color management system through an intermediate component in accordance with an embodiment of the invention.

FIG. 15 illustrates requesting component 1501 utilizing a program interface call to color management system 400 through intermediate component 1551 in accordance with an embodiment of the invention. As with FIG. 14, requesting component 1501 sends an input (input 1503 with parameters 1509 and 1511 or 1505 with parameters 1515 and 1517) to color management system 400. However, the input is sent through intermediate component 1551, which may be another application or a utility program. Intermediate component 1551 transfers the input to color management system 400. Also, intermediate component 1551 transfers the result (RETURN_RESULT 1507) to requesting component 1501, where parameter 1513 is indicative of the result.

Referring to FIGS. 14 and 15, inputs 1403, 1405, 1503, and 1505 may be expanded to a support a plurality of policy settings within each input, where parameters 1409, 1415, 1509, and 1515 may contain a list of parameter settings and where parameters 1413 and 1513 may contain a list of results for each of the corresponding parameter settings.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 16:
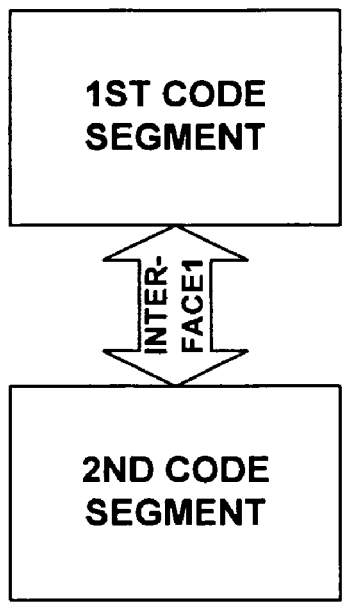
FIG. 16 illustrates an interface as a conduit through which first and second code segments communicate.
Figure 17:
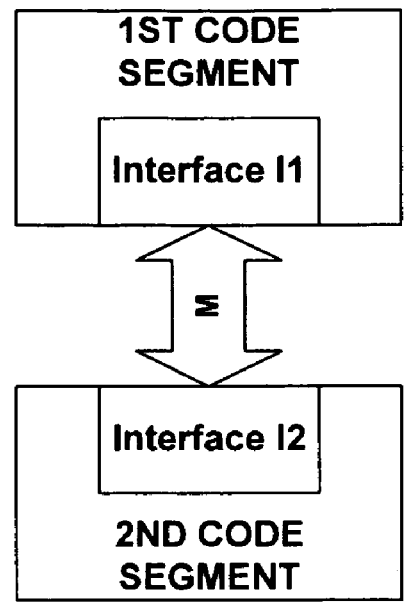
FIG. 17 illustrates an interface as comprising interface objects.

Notionally, a programming interface may be viewed generically, as shown in FIG. 16 or FIG. 17. FIG. 16 illustrates an interface Interface1 as a conduit through which first and second code segments communicate. FIG. 17 illustrates an interface as comprising interface objects I1 and I2 (which may or may not be part of the first and second code segments), which enable first and second code segments of a system to communicate via medium M. In the view of FIG. 17, one may consider interface objects I1 and I2 as separate interfaces of the same system and one may also consider that objects I1 and I2 plus medium M comprise the interface. Although FIGS. 16 and 17 show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 16 and 17, but they nonetheless perform a similar function to accomplish the same overall result. We will now briefly describe some illustrative alternative implementations of a programming interface.

Figure 18:
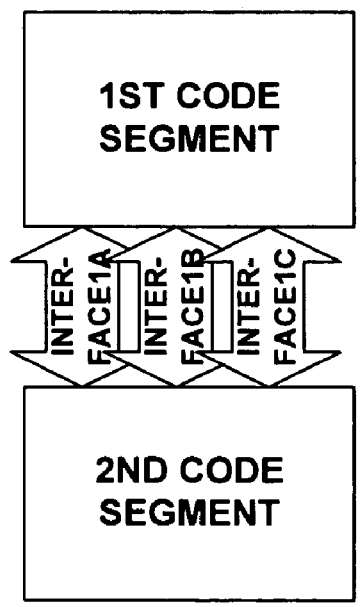
FIG. 18 illustrates a function provided by an interface that may be subdivided to convert communications of the interface into multiple interfaces.
Figure 19:
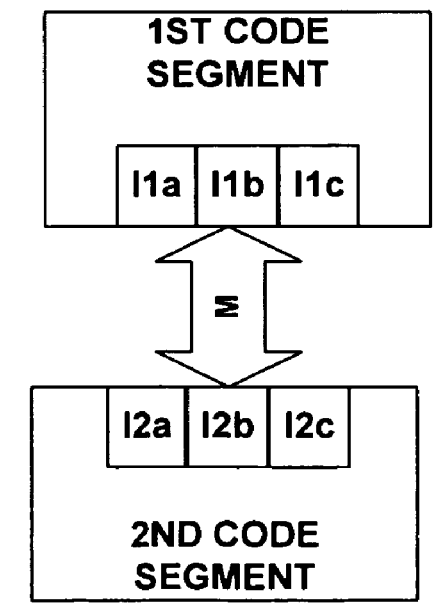
FIG. 19 illustrates a function provided by an interface that may be subdivided into multiple interfaces in order to achieve the same result as the function illustrated in FIG. 18.

A communication from one code segment to another may be accomplished indirectly by breaking the communication into multiple discrete communications. This is depicted schematically in FIGS. 18 and 19. As shown, some interfaces can be described in terms of divisible sets of functionality. Thus, the interface functionality of FIGS. 16 and 17 may be factored to achieve the same result, just as one may mathematically provide 24, or 2 times 2 times 3 times 2. Accordingly, as illustrated in FIG. 18, the function provided by interface Interface1 may be subdivided to convert the communications of the interface into multiple interfaces Interface1A, Interface 1B, Interface 1C, etc. while achieving the same result. As illustrated in FIG. 19, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 18 and 19, the functional spirit of interfaces Interface1 and I1 remain the same as with FIGS. 16 and 17, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 20:
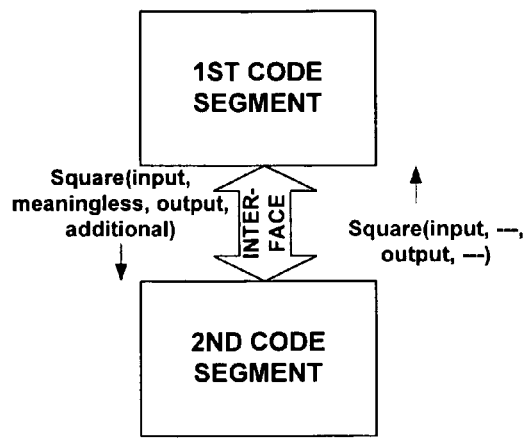
FIG. 20 illustrates an example of ignoring, adding, or redefining aspects of a programming interface while still accomplishing the same result.
Figure 21:
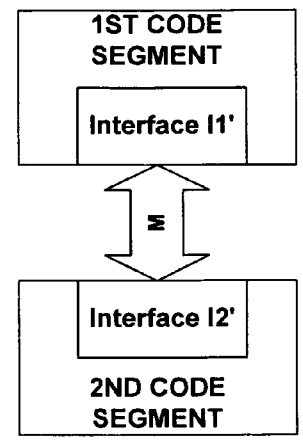
FIG. 21 illustrates another example of ignoring, adding, or redefining aspects of a programming interface while still accomplishing the same result.

In some cases, it may be possible to ignore, add or redefine certain aspects (e.g., parameters) of a programming interface while still accomplishing the intended result. This is illustrated in FIGS. 20 and 21. For example, assume interface Interface1 of FIG. 16 includes a function call Square (input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 20, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 21, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Figure 22:
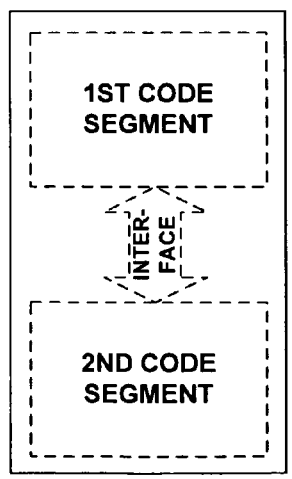
FIG. 22 illustrates merging code segments in relation to the example that is shown in FIG. 16.
Figure 23:
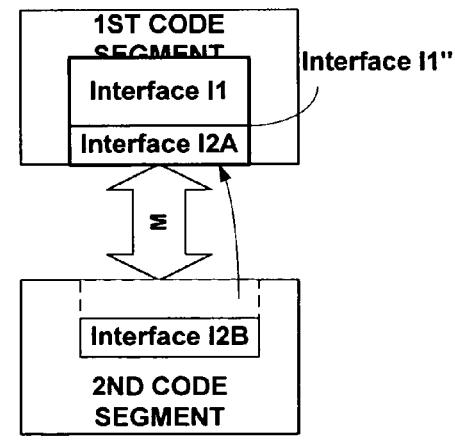
FIG. 23 illustrates merging interfaces in relation to the example that is shown in FIG. 17.

It may also be feasible to merge some or all of the functionality of two separate code modules such that the "interface" between them changes form. For example, the functionality of FIGS. 16 and 17 may be converted to the functionality of FIGS. 22 and 23, respectively. In FIG. 22, the previous $1^{st}$ and $2^{nd}$ Code Segments of FIG. 16 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 23, part (or all) of interface I2 from FIG. 17 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 17 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 25:
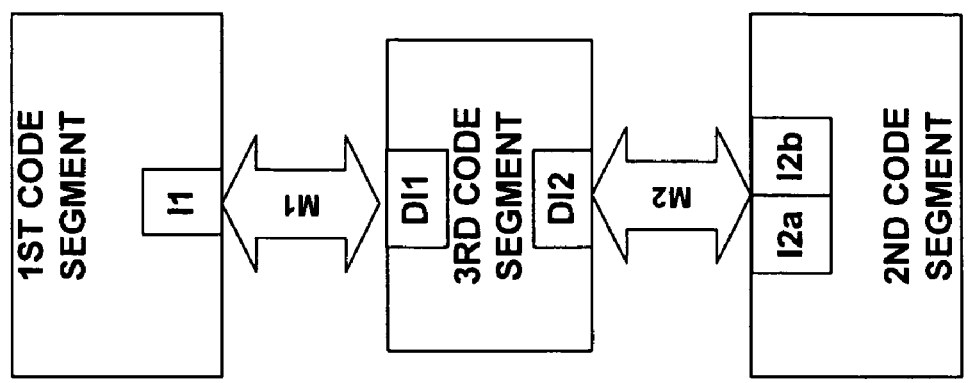
FIG. 25 illustrates a code segment that is associated with a divorce interface.
Figure 24:
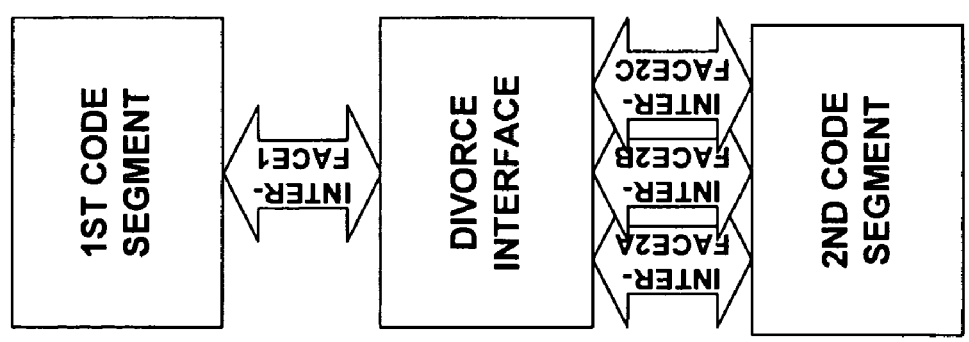
FIG. 24 illustrates middleware that converts communications to conform to a different interface.

A communication from one code segment to another may be accomplished indirectly by breaking the communication into multiple discrete communications. This is depicted schematically in FIGS. 24 and 25. As shown in FIG. 24, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 25, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 17 to a new operating system, while providing the same or similar functional result.

Figure 26:
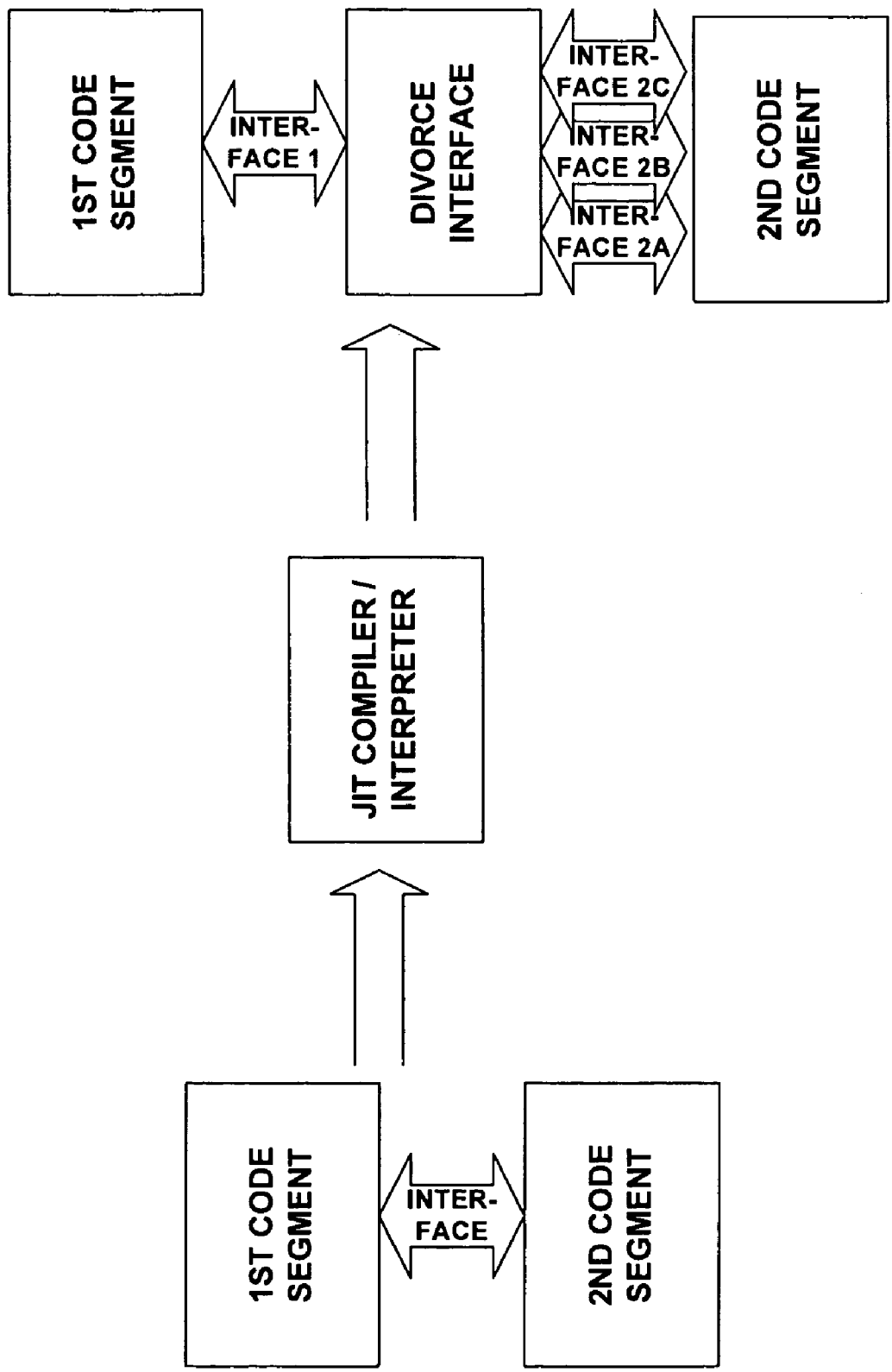
FIG. 26 illustrates an example in which an installed base of applications is designed to communicate with an operating system in accordance with an interface protocol, in which the operating system is changed to use a different interface.
Figure 27:
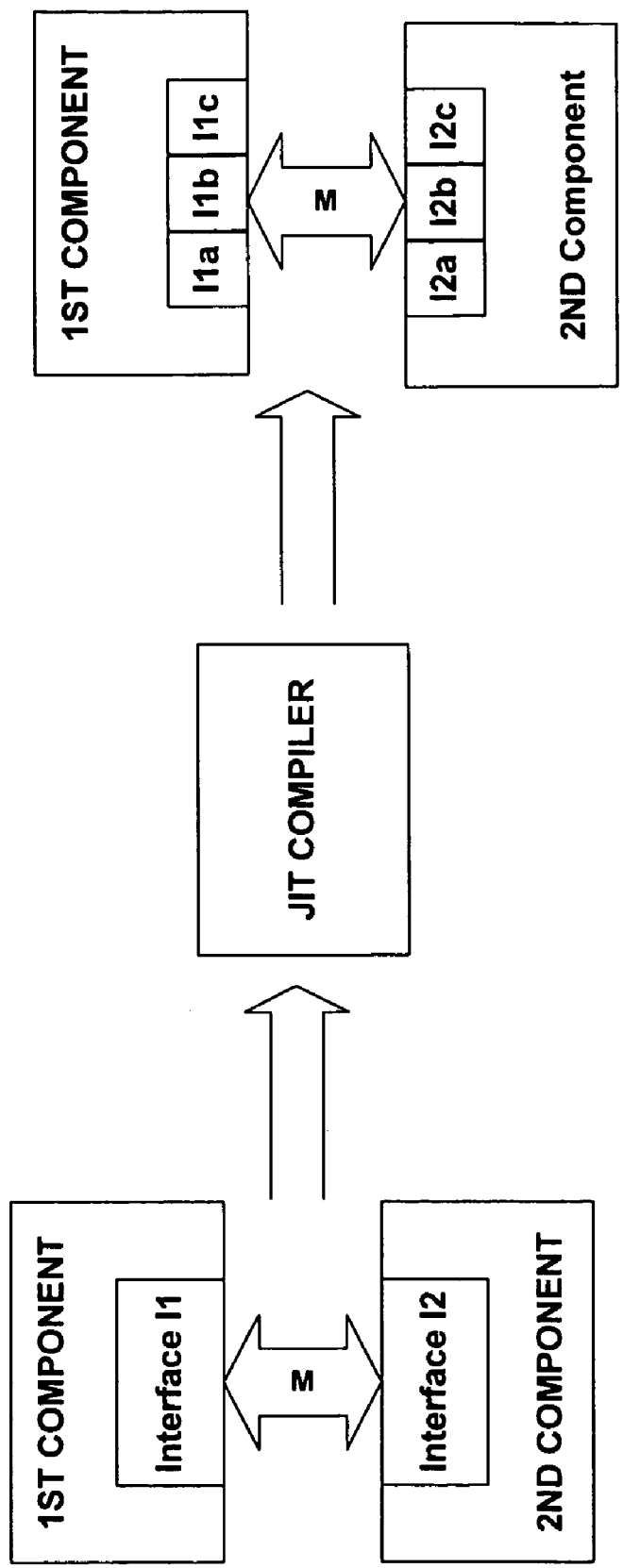
FIG. 27 illustrates rewriting interfaces to dynamically factor or otherwise alter the interfaces.

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 26 and 27. As can be seen in FIG. 26, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 27, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 16 and 17. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An apparatus comprising:
   a processor coupled to memory; and
   one or more modules stored in the memory and executable by the processor to perform color management for the apparatus, the one or more modules including a configuration module configured to:
   implement a color management policy structured to include multiple policy levels related one to another in a hierarchy, each of the multiple policy levels having one or more policy settings;
   receive input to configure the one or more policy settings at a selected said policy level of the hierarchy; and
   configure the color management policy in accordance with the one or more policy settings.

2. The apparatus as recited in claim 1, wherein a policy setting of the color management policy at a lower policy level of the hierarchy is configurable to override a policy setting at a higher policy level of the hierarchy.

3. The apparatus as recited in claim 1, wherein a higher policy level of the hierarchy is configurable to lockout a capability of a lower policy level of the hierarchy to override policy settings of the higher policy level of the hierarchy.

4. The apparatus as recited in claim 1, wherein the one or more modules are executable to expose a user interface configured to prompt a user for the input, receive a user response associated with the input, and communicate the input to the configuration module to cause configuration of the color management policy.

5. The apparatus as recited in claim 1, wherein the one or more modules are executable to expose an application programming interface (API) configured to receive the input through interaction with an application, and communicate the input to the configuration module to cause configuration of the color management policy.

6. The apparatus as recited in claim 1, wherein the configuration module is further configured to:
apply a first policy setting associated with the color management policy for a first policy level of the multiple policy levels;
apply a second policy setting associated with the color management policy for a second policy level of the multiple policy levels configured to override the first policy level;
determine if the first policy level locks out the ability of the second policy level to override the first policy level; and
configure the first policy setting based on the determination.

7. The apparatus as recited in claim 1, wherein the configuration module is further configured to communicate the color management policy to a color processing module to enable the color processing module to process an image for output to a destination in accordance with the color management policy.

8. The apparatus as recited in claim 7, wherein the color processing module is configured to:
perform processing of the image in accordance with a working space designated by the color management policy; and
build a transformation table from at least one profile and values from the working space, to convert the image to a color space corresponding to the destination.

9. The apparatus as recited in claim 8, wherein the one or more modules of the apparatus include the color processing module.

10. The apparatus as recited in claim 1, wherein the multiple policy levels of the hierarchy comprise a system level, a user level, an operational level, a profile level, a device and codec level, and an application program interface (API) level.

11. A method implemented by one or more devices of a color management system comprising:
exposing a color management user interface having a plurality of portions selectable to configure a color management policy having multiple policy levels that are related one to another in a hierarchy, each said portion selectable to configure one or more settings of the color management policy for a corresponding one of the multiple policy levels;
receiving user selections via the portions of the user interface to configure respective said settings; and
communicating the user selections to a configuration module to configure the color management policy in accordance with the user selections.

12. The method as recited in claim 11, wherein a higher policy level of the hierarchy is configurable via the user selections to lockout a capability of a lower policy level of the hierarchy to override policy settings of the higher policy level of the hierarchy.

13. The method as recited in claim 11, wherein the multiple policy levels of the hierarchy comprise a system level, a user level, an operational level, a profile level, a device level, and an application program interface (API) level.

14. The method as recited in claim 13, wherein settings of the color management policy that are configurable via the user interface at the system level control at least whether color management is enabled.

15. The method as recited in claim 13, wherein settings of the color management policy that are configurable via the user interface at the user level enable different users of the color management system to configure different color management policies without affecting one another.

16. The method as recited in claim 13, wherein:
settings of the color management policy that are configurable via the user interface at the operational level enable policy settings that are contingent upon a type of operation being performed by the color management system; and
settings of the color management policy that are configurable via the user interface at the device level enable configuration of device specific policy settings.

17. One or more computer-readable storage media storing instructions that, when executed by a color management device, cause the color management device to expose an application programming interface (API) operable to:
receive an input from a component, the input being indicative of a color policy setting for a color management policy structured to include multiple policy levels related one to another in a hierarchy, and
communicate the input to a configuration module of the color management device to cause configuration of the color management policy at one or more of the multiple policy levels by the configuration module in accordance with the input.

18. One or more computer-readable storage media as recited in claim 17, wherein the color policy setting controls whether a higher policy level of the hierarchy locks out a capability of a lower policy level of the hierarchy to override policy settings of the higher policy level of the hierarchy.

19. One or more computer-readable storage media as recited in claim 17, wherein the component is an application executed by the color management device.

20. One or more computer-readable storage media as recited in claim 17, wherein the application programming interface (API) is further operable to:
receive a request from the component for a current value of a policy setting for one or more of the multiple policy levels of the hierarchy;
obtain the requested current value through interaction with the configuration module; and
communicate the requested current value to the component.

* * * * *